United States Patent
Park et al.

(10) Patent No.: US 8,797,414 B2
(45) Date of Patent: *Aug. 5, 2014

(54) DIGITAL IMAGE STABILIZATION DEVICE

(75) Inventors: SungSoo Park, Cupertino, CA (US); Matthias Braun, Mountain View, CA (US)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 176 days.

This patent is subject to a terminal disclaimer.

(21) Appl. No.: 13/313,684

(22) Filed: Dec. 7, 2011

(65) Prior Publication Data

US 2012/0162450 A1    Jun. 28, 2012

Related U.S. Application Data

(60) Provisional application No. 61/426,970, filed on Dec. 23, 2010, provisional application No. 61/426,975, filed on Dec. 23, 2010.

(51) Int. Cl.
*H04N 5/228* (2006.01)
*G03B 17/00* (2006.01)

(52) U.S. Cl.
USPC ............................ 348/208.3; 396/54

(58) Field of Classification Search
USPC .............. 348/208.99, 208.1, 208.3, 208.6, 348/208.14; 396/54, 55
See application file for complete search history.

(56) References Cited

U.S. PATENT DOCUMENTS

| | | | |
|---|---|---|---|
| 5,608,458 A | 3/1997 | Chen et al. | |
| 5,714,918 A | 2/1998 | Menkhoff | |
| 6,788,819 B1 | 9/2004 | Swann et al. | |
| 7,623,153 B2* | 11/2009 | Hatanaka | 348/208.3 |
| 7,633,525 B2* | 12/2009 | Hatanaka | 348/208.3 |
| 7,880,769 B2* | 2/2011 | Qi | 348/208.99 |
| 7,961,222 B2* | 6/2011 | Motomura et al. | 348/208.6 |
| 8,031,229 B2* | 10/2011 | Mori | 348/208.99 |
| 8,120,661 B2* | 2/2012 | Rabinowitz et al. | 348/208.6 |
| 8,274,570 B2* | 9/2012 | Handa et al. | 348/208.3 |
| 8,279,291 B2* | 10/2012 | Ooishi | 348/208.6 |
| 8,289,402 B2* | 10/2012 | Saito | 348/208.4 |
| 8,508,599 B2* | 8/2013 | Miyasako | 348/208.1 |
| 8,509,481 B2* | 8/2013 | Miyasako | 382/103 |
| 2007/0288141 A1 | 12/2007 | Bergen et al. | |
| 2008/0144124 A1 | 6/2008 | Samadani et al. | |
| 2008/0199050 A1* | 8/2008 | Koitabashi | 382/107 |
| 2009/0028462 A1 | 1/2009 | Habuka et al. | |
| 2009/0086103 A1* | 4/2009 | Nair | 348/699 |
| 2009/0135261 A1* | 5/2009 | Imamura et al. | 348/208.99 |
| 2009/0161827 A1 | 6/2009 | Gertner et al. | |
| 2010/0118156 A1* | 5/2010 | Saito | 348/208.6 |
| 2011/0050993 A1* | 3/2011 | Wang et al. | 348/452 |
| 2011/0307537 A1 | 12/2011 | Hirayama | |
| 2012/0162449 A1* | 6/2012 | Braun et al. | 348/208.4 |
| 2012/0162454 A1* | 6/2012 | Park et al. | 348/208.6 |
| 2012/0281104 A1* | 11/2012 | Ohmiya et al. | 348/208.6 |
| 2013/0128065 A1* | 5/2013 | Jin et al. | 348/208.6 |

* cited by examiner

*Primary Examiner* — John Villecco
(74) *Attorney, Agent, or Firm* — F. Chau & Associates, LLC

(57) ABSTRACT

A method of Digital Image Stabilization (DIS) including a feature point sorting algorithm for selecting optimal feature points, and a computationally efficient tile-vector based Hierarchical Block-Matching search algorithm for deriving motion vectors of the selected feature points, and a feature point motion vector grouping/comparison process for grouping pairs of the selected feature points based on their vector magnitude ratio and their angular difference.

26 Claims, 22 Drawing Sheets

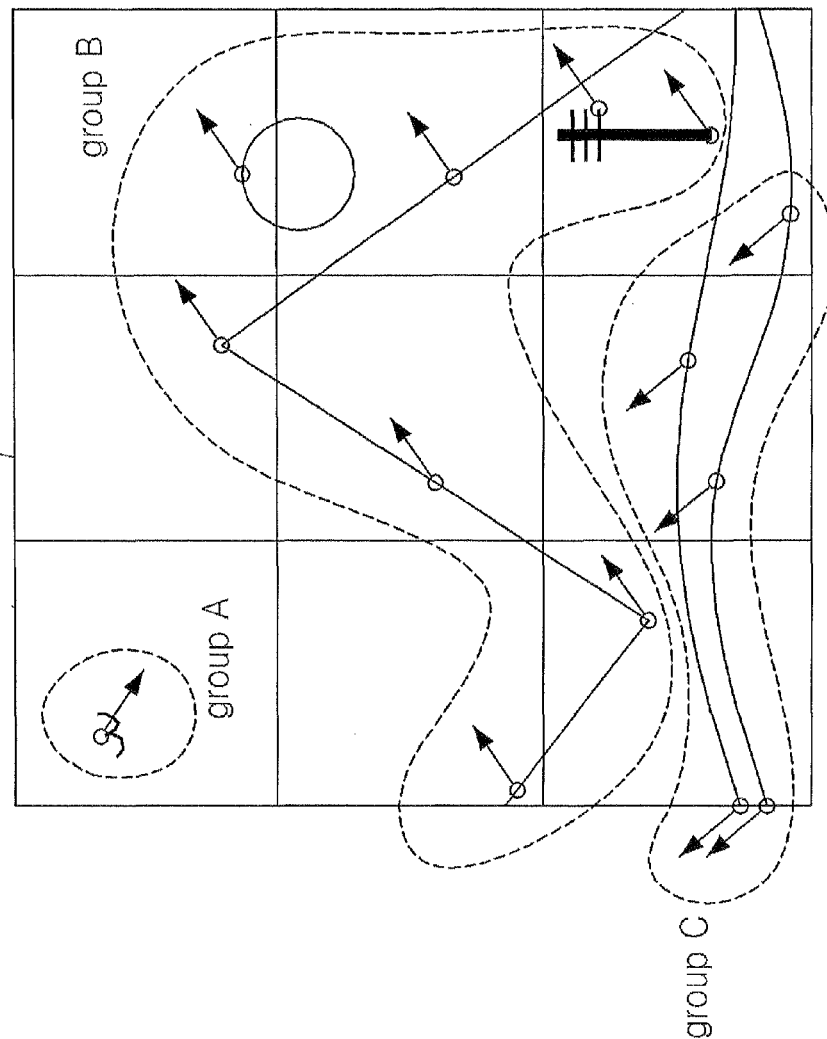

Reference Frame Ft+1 (translated and rotated etc. to remove jitter)

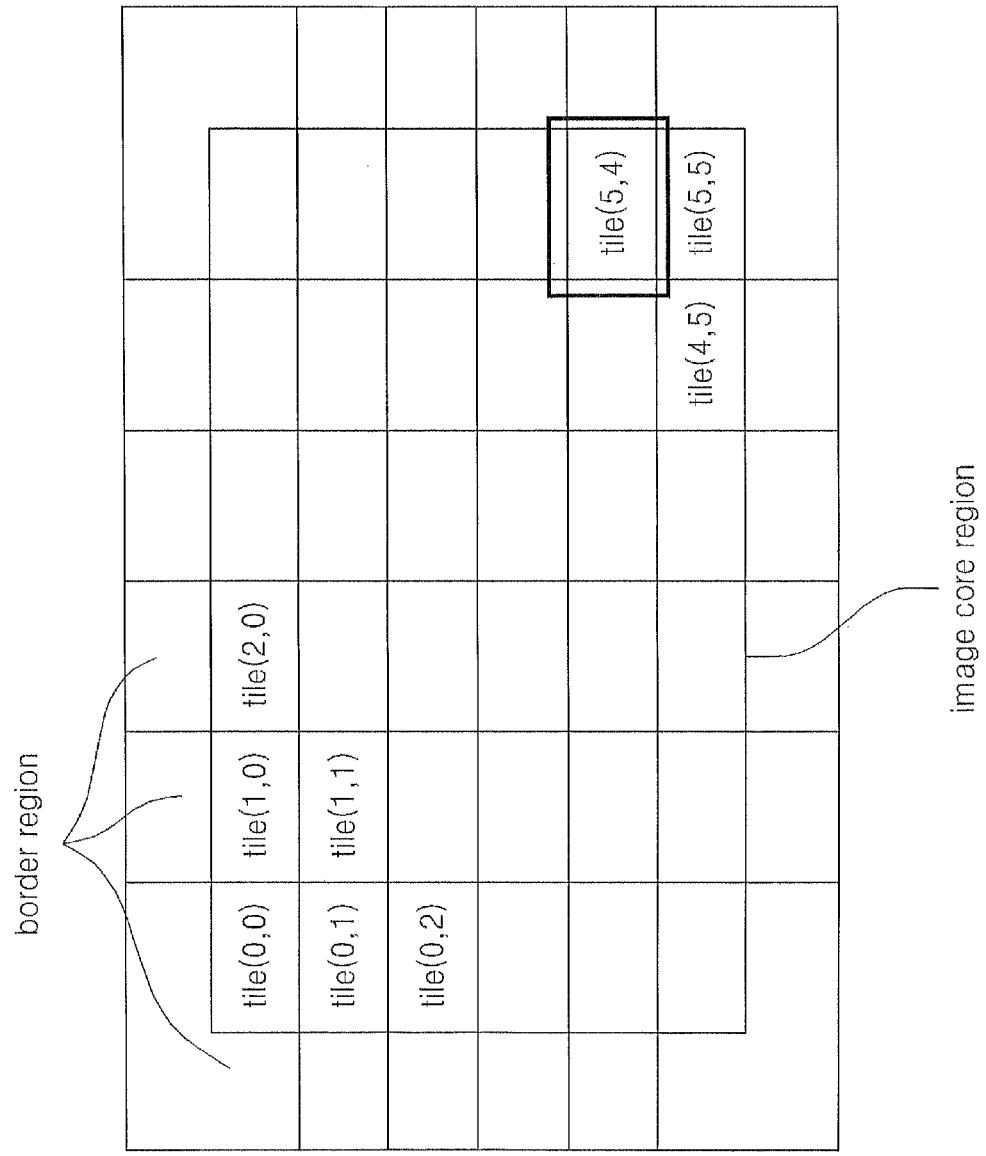

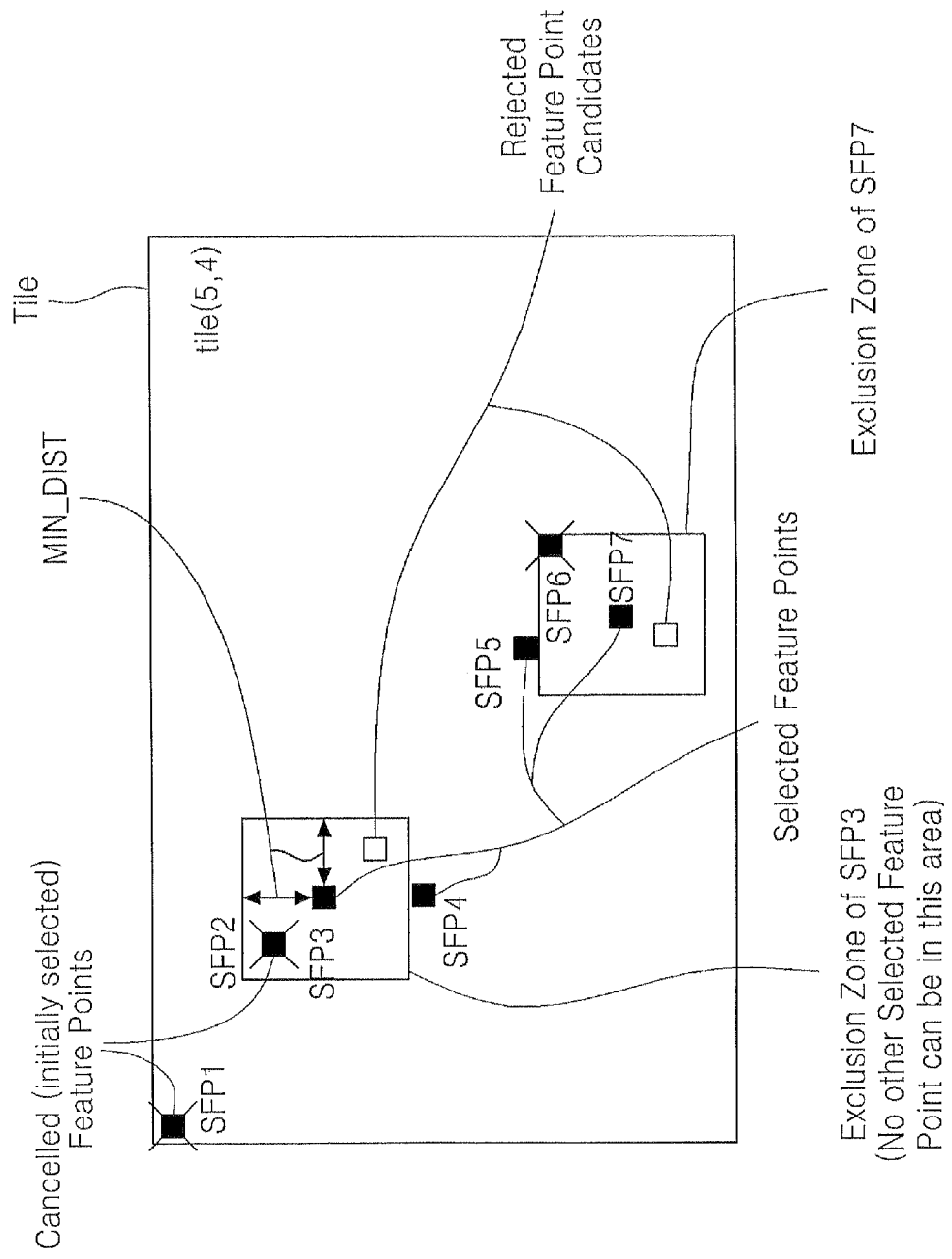

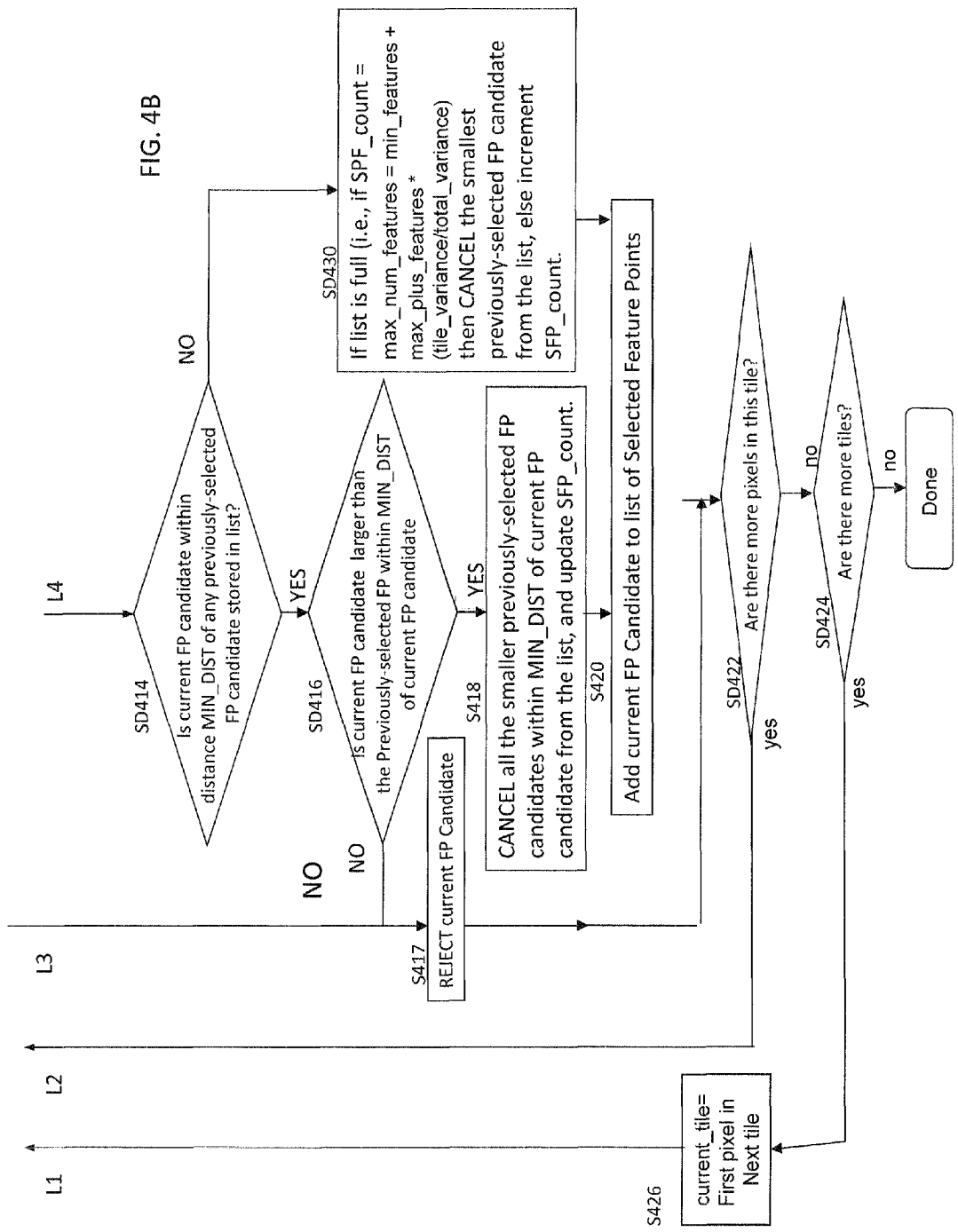

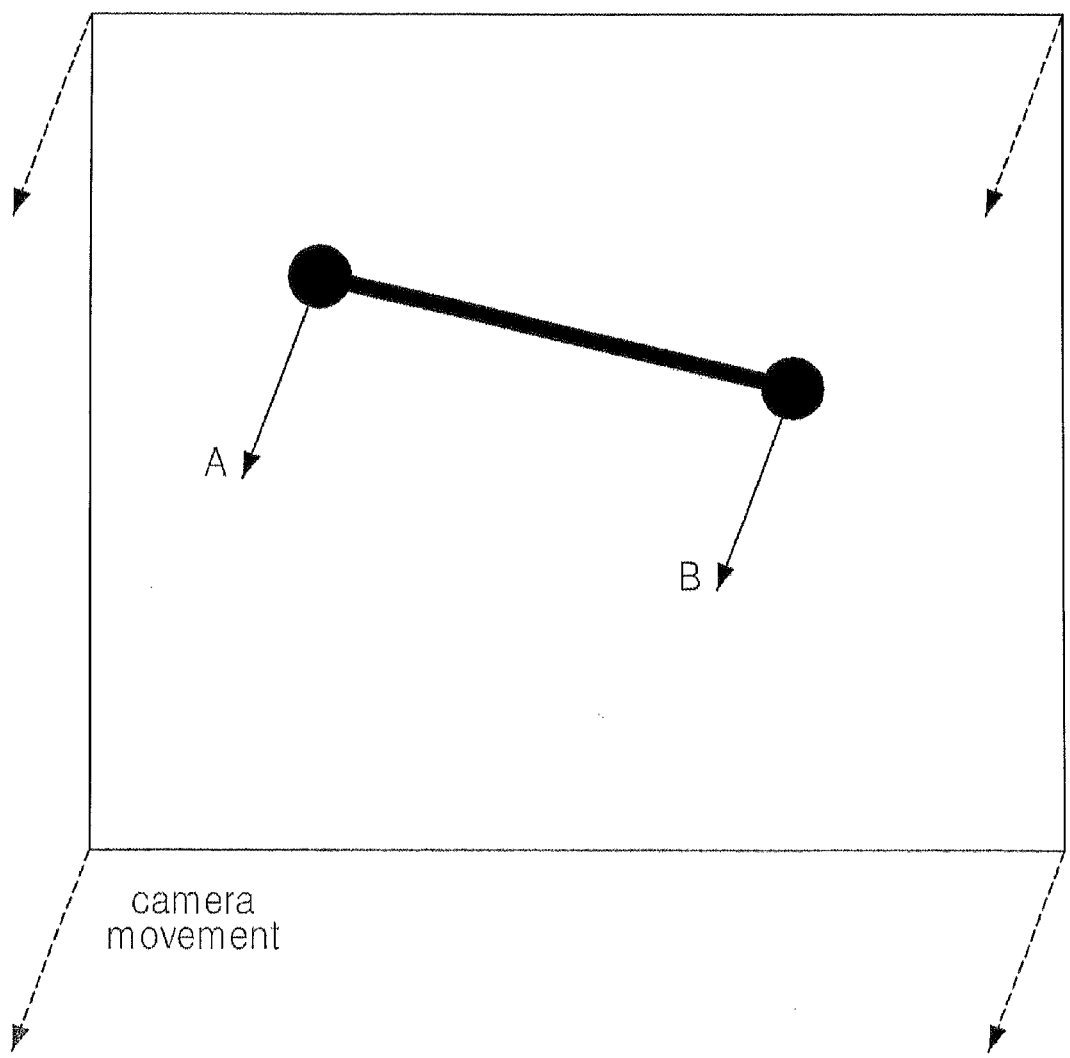
(a) Translational camera movement (b) Rotational camera movement (c) Translational camera movement (a) Vector Difference (b) Normalized Vector Difference (c) magnitude of Normalized Vector Difference

DIGITAL IMAGE STABILIZATION DEVICE

CROSS-REFERENCE TO RELATED APPLICATION

This application claims priority under 35 U.S.C. §120 to U.S. Provisional Application No. 61/426,970, and 61/426,975, both filed in the U.S. Patent and Trademark Office on Dec. 23, 2010. The disclosures of both provisional applications are incorporated by reference herein.

TECHNICAL FIELD

The present inventive concept herein relates to digital image-stabilization (DIS), and more particularly, to a method of detecting, selecting and grouping feature points for digital image stabilization.

DISCUSSION OF THE ART

Digital cameras, digital video cameras and hand-held devices including such cameras capture are often employed to capture images or video while the camera is operated in the hand of a human operator. Thus, the video camera may be shaking or jittering in the operators hand while capturing the image or video. The jitter may include a horizontal component, a vertical component, and a rotational component. The rotation may be about an axis perpendicular to the focal plane of the image capturing circuit, or about an axis parallel to the focal plane of the image capturing circuit, or about an axis askew between a perpendicular axis and a parallel axis. The jitter may make the hand-captured video distracting or disorienting for the viewer, and thus it is desirable to use digital circuits to digitally estimate camera trajectory (i.e., the jitter as detected between each pair of consecutive frames) and to filter out the jitter from a sequence of video frames of the same scene. The circuits employed to estimate camera trajectory between consecutive video frames and to filter out the jitter caused by the camera's trajectory from a sequence of video frames may be contained within the video camera itself, and activated to remove in real time the jitter prior to storage of the captured video frames (e.g., prior to or during MEPG encoding if the video camera includes a real-time MPEG encoder). Alternatively the circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

The video produced by a steady, either stationary or moving video camera contains mainly smooth motions (translation, rotation) in the captured video. On the other hand, an unsteady video camera produces video with high frequency jitter (translational and/or rotational) throughout the video images.

Digital image sequences captured from physical imaging devices often display unwanted high frequency jittering motion. The amount of jittering motion present in an image sequence depends on the physics of the image capture device relative to objects in the captured sequence. The depth of the scene and the instability in the imager's mount, dependant on the mount's weight, inertia, balance, combine to create undesired jittery global motion.

A digital image stabilization (DIS) system first estimates unwanted (unintended) motion and then applies corrections to the image sequence. The visual effect of a stabilized video is highly dependent on the quality of camera trajectory estimation. Digital image stabilization (DIS) algorithms use well-tracked feature points to estimate the jittery motion between two consecutive frames. Digital video stabilization employs hardware and/or software methods for producing a spatially stabilized video from an otherwise unstable video containing unintended jerky motions caused by an unsteady video camera. In conventional DIS technology, camera movement is detected by analyzing motion vectors of various points in the scene. But the motion vectors can be caused by object movements as well as camera movement.

There are functions that provide a numerical score for each pixel of the frame, indicating how suitable this point is as a feature point detectable in timewise adjacent frames. One example of such a function is the Harris Corner Detector. However, the magnitude of the feature points are typically very different for different parts of the image. DIS methods may employ a global threshold, to be compared with each pixel's numerical score, that does not necessarily result in an optimal distribution of feature points. Thus, there may be too few feature points in regions of low contrast (e.g., blue sky without any clouds causing sparse or no feature points), while in regions with a lot of structure, the feature points may be too close to one another. The misdistribution of feature points can then increase the computational burden of calculating redundant motion vectors of the feature points that are too close, and can fail to provide accurate motion vectors.

In an implementation of a digital image stabilization (DIS) method, it is desirable to minimize the computational overhead in order to reduce power consumption of the circuit and to reduce the time required to perform the DIS method. It is also desirable to detect and measure the camera's trajectory and characterize the jitter accurately so that the jitter may be correctly compensated for and correctly removed from the stored/displayed video.

In mathematics, affine geometry is the study of geometric properties which remain unchanged by affine transformations, i.e. non-singular linear transformations and translations. A mathematical system of equations defined by numerical coefficients, called an Affine matrix, has been developed to characterize the lateral (up/down), rotational, and scalar (e.g., zoom in or zoom out) of movement detected between each pair of consecutive frames or between portions thereof (e.g., moving objects in the frames).

Thus, the jitter may be characterized by a first Affine transform matrix related to any actually-stationary objects (e.g., rocks, tables, parked cars, mountains, the sun) in the scene, called a Principal Transform, or Global Transform, while any moving objects (e.g., birds, people, balls, moving cars) in the frame may be characterized by additional Affine matrices.

The Principal Transform (principle inter-frame transform) indicating camera motion that may be caused by the user's hand jitter may be computed by detecting one or more points of interest (called "Feature Points") associated with the actually-stationary objects in each frame captured at time t, and then searching for the same Feature Points in a timewise adjacent frame (t+1), and computing a motion vector for each of the Feature Points. A plurality of motion vectors associated (grouped) with a particular object are then used to compute the Affine Transform of that object, which defines its detected motion according to the Affine equation:

$$x' = sx^*x + ry^*y + tx$$

$$y' = rx^*x + sy^*y + ty$$

Motion vectors of feature points between consecutive frames can be computed using various search methods employed in the field of video compression. Such search methods may employ a mathematical comparison of macroblocks, such as the sum of absolute differences (SAD), the mean absolute difference (MAD), or the mean square error (MSE), in two timewise adjacent frames (e.g., searching for the location of the feature point in a reference frame (t+1) by comparing the 8×8 pixel macroblock containing the feature point in the current frame with a plurality of 8×8 pixel macroblocks in a search area in the reference frame (t+1) centered about the location of the feature point). The measured amount and direction of the displacement of a macroblock centered about a feature point, between timewise adjacent frames (t and t+1), is called the "motion vector" of the feature point. Motion vector estimation methods of the related art using block matching algorithms (BMA) within various selected ranges are described in U.S. Pat. No. 6,895,361 by Yang, and in U.S. Pat. No. 7,680,186 by Lee, which are incorporated by reference herein.

SUMMARY

An aspect of the inventive concept provides a highly efficient process of identifying feature points, and of deriving motion vectors for the feature points that move in a coherent way because of global movement or camera movement, while at the same time being accurate for DIS purposes.

Good feature points for the DIS algorithm are points that yield non-ambiguous motion vectors when a suitable motion estimation algorithm is applied. To identify feature points in an image, a Harris Corner Detector applied to pixels of a video frame estimates how well suited each pixel is as a feature point. Different regions of the image have a different density of identified feature point candidates. A disclosed method of raster scan order selection and sorting provides a final feature point distribution based on small regions of the video frame, called tiles, where the maximum number of feature points grows linearly with the variance $\sigma^2$ of the luminance image data of the tile.

Each video frame is divided into a small number j×k of tiles. The number j×k of tiles can range from 4×4 for SD video to 6×6 or larger for HD video; other numbers in the range from (4 . . . 8)×(4 . . . 8) are also possible and may be beneficial. The tile size is chosen such that sufficiently large objects that move independently cover the majority of at least one tile, so that their motion can be captured for DIS purposes, while the motion of small objects is ignored.

Tiles having more interesting image data and therefore the need for more feature points are expected to have a higher variance $\sigma^2$. The feature point sorting algorithm finds a programmable minimum distance between feature points but requires minimal hardware memory.

A hierarchical motion estimation algorithm may be used to estimate the feature point movement from frame to frame, where the programmable motion range for the later search levels is intentionally small, thereby preferring large-object or global movement over local movement. Consequently, the required number of operations is minimized, while the results are sufficiently accurate for digital image stabilization applications.

For each of the feature points that have been selected, e.g., by a sorting algorithm, its motion vector is determined by block matching within a small range of start vectors that are used. The start vectors are the tile motion vectors of the tile containing the current feature point and of the surrounding tiles (e.g., Up, Down, Left, Right). The tile motion estimation is the first step in the process of deriving motion vectors of the feature points. Tile motion estimation is done on the basis of non-overlapping tiles that cover the central portion of the input image (e.g., the same tiles used in the feature point sorting algorithm). For tile motion estimation of each of the tiles, a full blockmatching search is performed on a downsampled image.

The current frame is subsampled by a second subsampling factor $f_{s2}$ of four to eight for standard definition (SD) video or eight to sixteen for high definition (HD) video. In this subsampled domain, a full-search block matching is done for every tile and the tile vector is stored for later use (e.g., as a start vector for deriving the motion vectors of the feature points). One motion vector will be estimated for every tile, doing a full search with the lowest-resolution, subsampled by second subsampling factor $f_{s2}$, of subsampled luminance data, and the motion vector candidate that yields the lowest SAD is assigned to each tile. According to an embodiment, for the border tiles, the search may be restricted to the available search area, thus no motion vector that causes the reference block to be (partially) outside the search area will be generated. Relative to the resolution used, the tile motion search will generate half-pel accurate vectors: The search area will be upsampled by simple bilinear interpolation. This uses only very little local memory, thus saving memory and logic area in a VLSI implementation.

An aspect of the inventive concept provides a Digital Image Stabilization (DIS) method including a feature point motion vector grouping process for grouping pairs of feature points based on their motion vector magnitude ratio and the angular difference between their motion vectors. A method of processing video data is provided, comprising: receiving first image data representing a first frame; identifying a plurality of feature points in the first frame; receiving a second image data representing a second frame; deriving a motion vector corresponding to each of the feature points; selecting a first one of the motion vectors as the current vector A and selecting a second one of the motion vectors as the current vector B; and comparing vector A with vector B based on their vector magnitude ratio and their angular difference.

The method may further comprise: setting a magnitude ratio threshold and an angular difference threshold; and grouping vector A and vector B together if their vector magnitude ratio falls within the magnitude ratio threshold and their angular difference falls within the angular difference threshold. According to a further aspect, comprising: NOT grouping vector A and vector B together if their vector magnitude ratio falls outside the magnitude ratio threshold or if their angular difference falls outside the angular difference threshold.

According to an embodiment of the present inventive concept, a video processing circuit is provided, comprising: a feature point circuit configured to identify a plurality of feature points in a first frame and deriving a motion vector between the first frame and a second frame for each feature point; a paring controller configured to select one of the motion vectors as the current vector A (xa, ya) and to select a different one of the motion vectors as the current vector B (xb, yb); a magnitude ratio comparator configured to compare vector A with vector B based on their vector magnitude ratio; and a vector angle comparator configured to compare vector A with vector B based on their vector angular difference.

According to an exemplary embodiment, a method of processing video data is provided, comprising: estimating a motion vector for each feature point in a first frame of the video data; grouping motion vectors into motion vector groups based on vector magnitude ratios and angular differences; and selecting a group containing motion vectors representing the movement of a stationary object within a scene of the first frame. The method may further comprise: estimating a motion vector for each of a plurality of tiles divided from a portion of the first frame, using subsampled luminance data, and selecting the tile motion vector candidate having the lowest sum-of-absolute-difference (SAD); and grouping tile motion vectors into tile motion vector groups based on vector magnitude ratios and angular differences.

According to an embodiment of the present inventive concept, a camera is provided, comprising: an image capture circuit configured to capture images and convert a plurality of images to first frame and second frames of image data; and a video processing circuit chip comprising: a feature point circuit configured to identify a plurality of feature points in the first frame and deriving a motion vector between the first frame and the second frame for each feature point; a paring controller configured to select each pair of motion vectors among the motion vectors of the feature points; a magnitude ratio comparator configured to compare each pair of motion vectors based on their vector magnitude ratio; and a vector angle comparator configured to compare each pair of motion vectors based on their vector angle difference.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures:

FIGS. 1A through 1F are views of a current frame and a reference frame, and selected Feature Points and motion vectors thereof, for illustrating in a method of Digital Image Stabilization in accordance with an exemplary embodiment of the inventive concept;

FIG. 2A is a diagram of the captured frame of FIG. 1E containing the current frame $F_t$ of FIG. 1A, and divided into a border region and a plurality j×k of tiles in a core region, in accordance with a step in the DIS method illustrated in FIGS. 1A through 1F;

FIG. 2B is a diagram of one tile in the core region of the image frame of FIG. 2A illustrating selected, rejected, and cancelled Feature Points, in accordance with steps in the DIS method illustrated in FIGS. 1A through 1F;

FIGS. 4A and 4B are flow charts of a method of identifying and selecting a plurality of Feature Points in each tile of the image frame of FIGS. 1A and 2A, for performing steps in the DIS method illustrated in FIGS. 1A through 1F;

FIG. 8A is a diagram of motion vectors of two feature points of the same actually-stationary object in a video scene at the same distance from the camera when the camera has only translational movement and no rotational component;

DETAILED DESCRIPTION OF EXEMPLARY EMBODIMENTS

FIGS. 1A through 1F are views of a current frame and a reference frame, and selected Feature Points and motion vectors thereof, for illustrating the steps in a method of Digital Image Stabilization in accordance with an exemplary embodiment of the inventive concept.

Figure 1A:
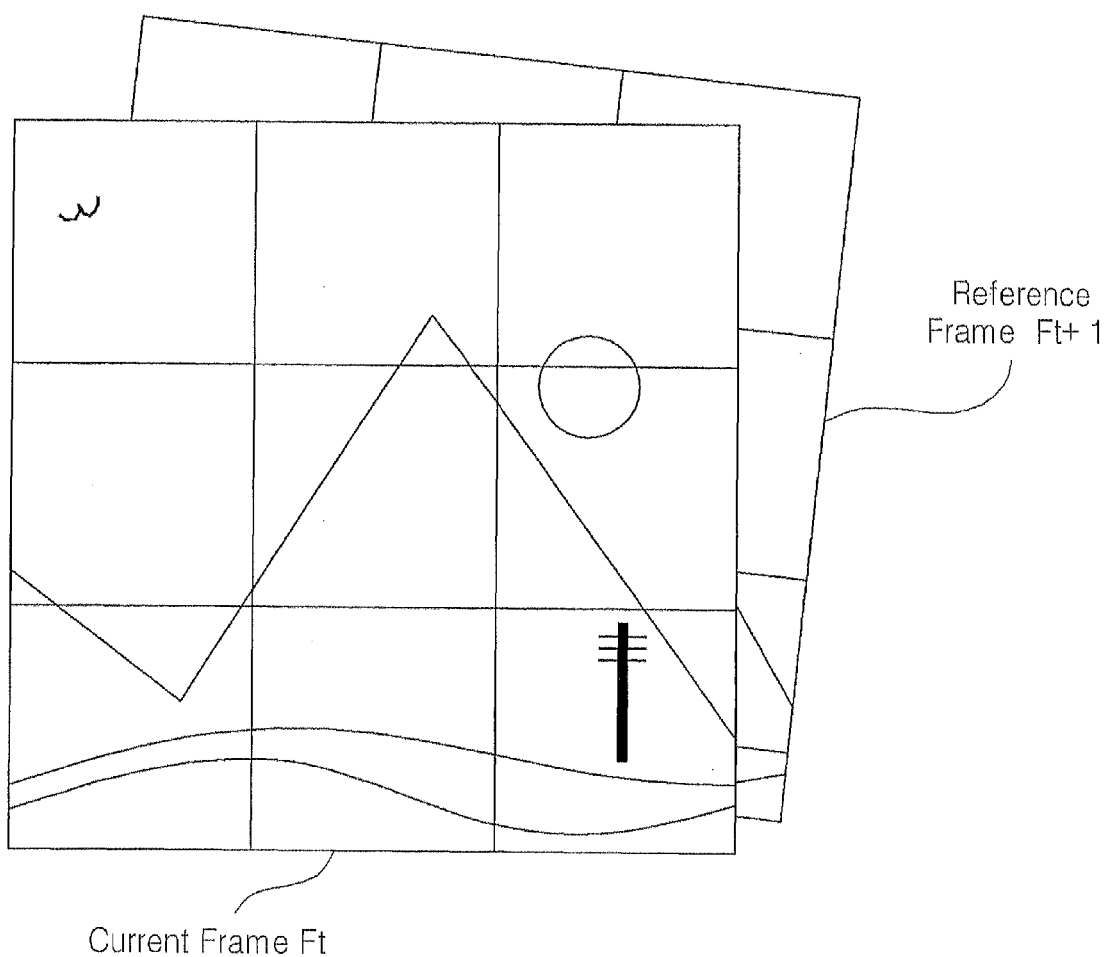

FIG. 1A shows two consecutive video frames, a current frame $F_t$ and a reference frame $F_{t+1}$, of a scene. The scene includes stationary objects, e.g., hills in the foreground, a pole, and mountains, and the sun, and a moving object, e.g., a bird in the top left. The current frame $F_t$ and the reference frame $F_{t+1}$ are portions of respective consecutive captured frames having a larger area (as shown in FIG. 1E). The larger captured frames are the raw images captured by an image sensor, before Digital Image Stabilization (DIS). The reference frame $F_{t+1}$ is rotated and translated relative to current frame $F_t$, due to a camera trajectory caused by jittery motion. The dimensions of the captured frame (see FIG. 1E) is typically predetermined by the hardware dimensions of the physical image sensor (not shown) of the video camera. The dimensions of the current frame $F_t$ and the reference frame $F_{t+1}$ may be selected dynamically to avoid or minimize the occurrence of "overexcursions" of the current frame $F_t$ beyond the bounds of the captured frame due to jittery motion of the camera.

Figure 1B:
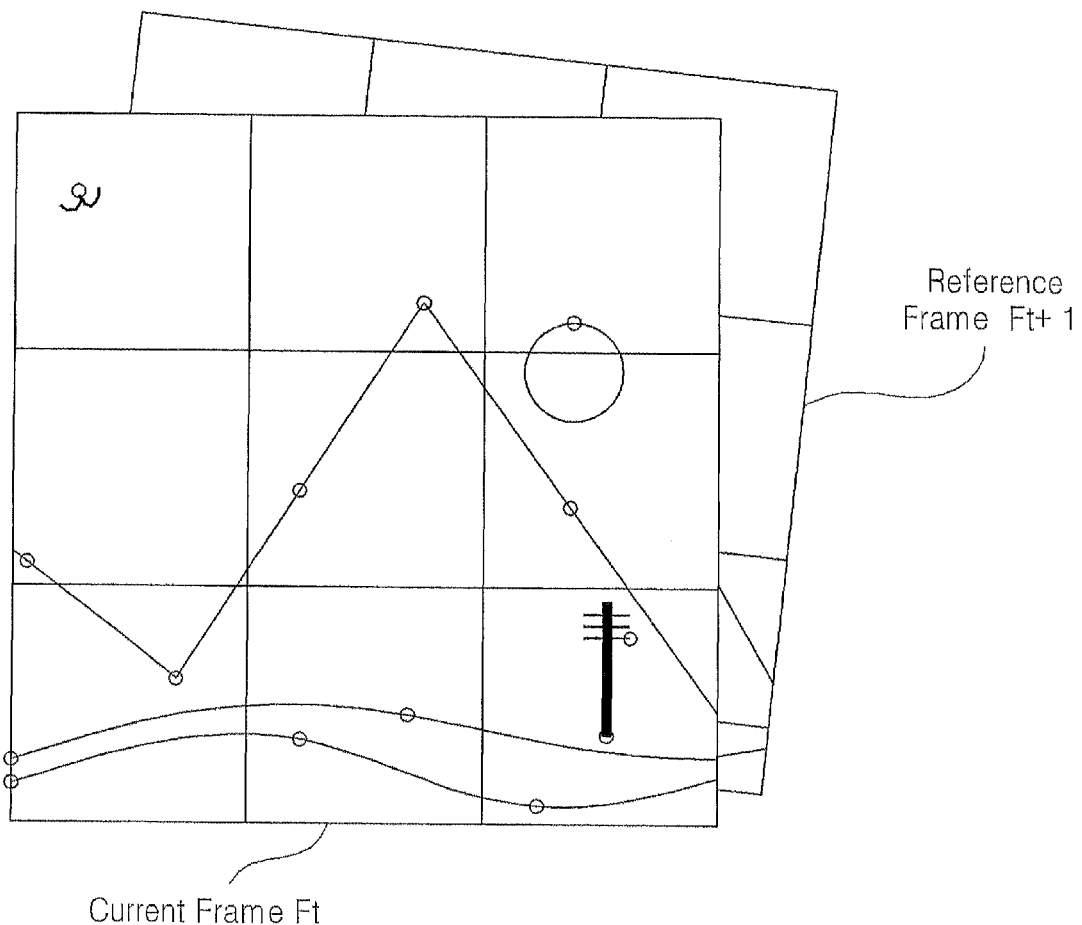

FIG. 1B shows a plurality of selected feature points (circles) in the current frame $F_t$ associated with the actually-stationary objects and the moving object in the scene. The current frame $F_t$ is divided into a plurality of rectangular tiles, and each tile comprises at least one selected feature point. The selected feature points shown in FIG. 1B may be identified and selected by performing the steps of a method illustrated in FIGS. 2A, 2B, and 4A and 4B, and/or by the circuit of FIG. 3. The current frame and the reference frame are stored in the memory 350 of the circuit of FIG. 3 while the selected feature points shown in FIG. 1B are being identified and selected by performing the steps of the method illustrated in FIGS. 2A, 2B, and 4A and 4B.

Figure 1C:
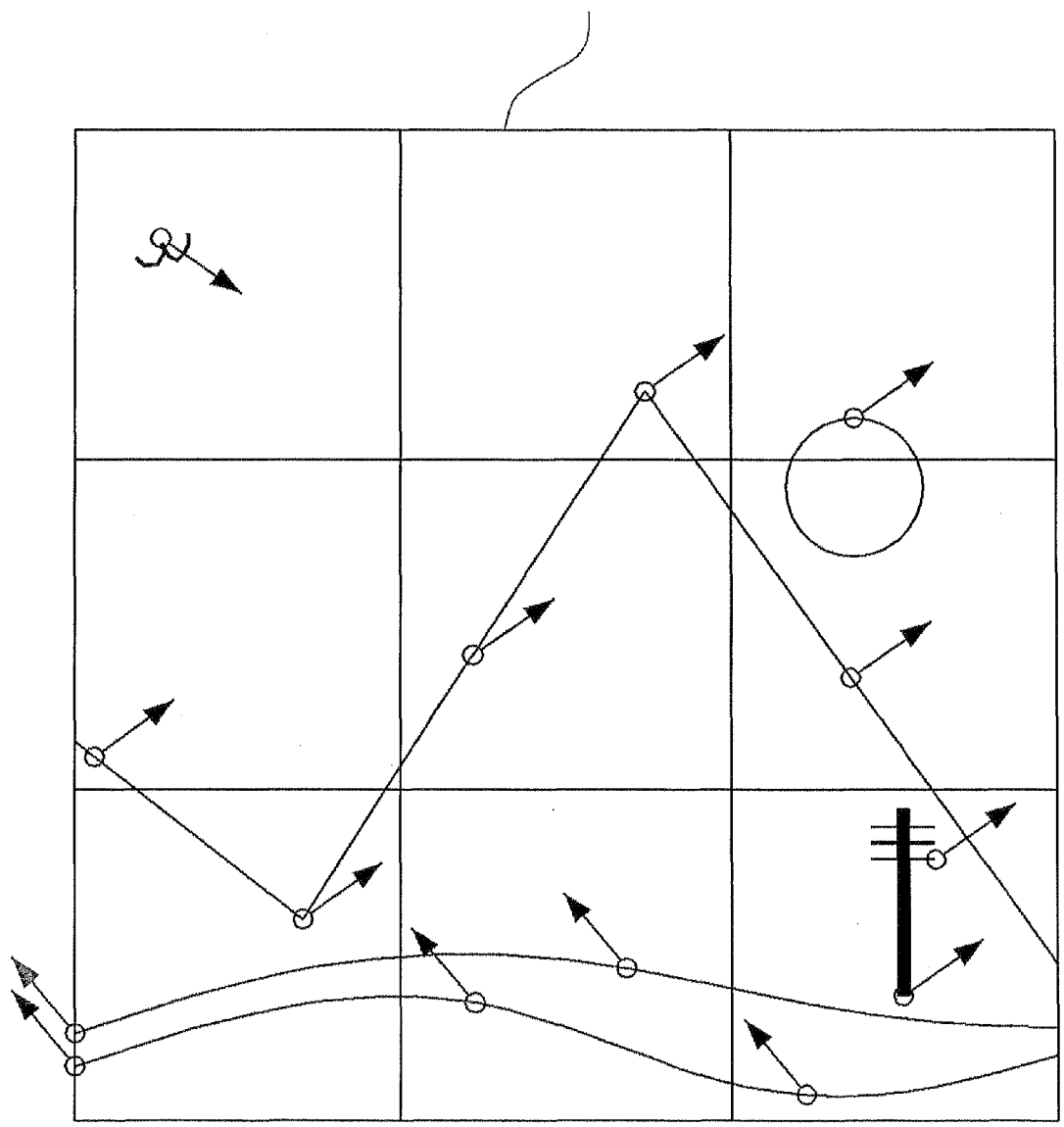
Figure 1E:
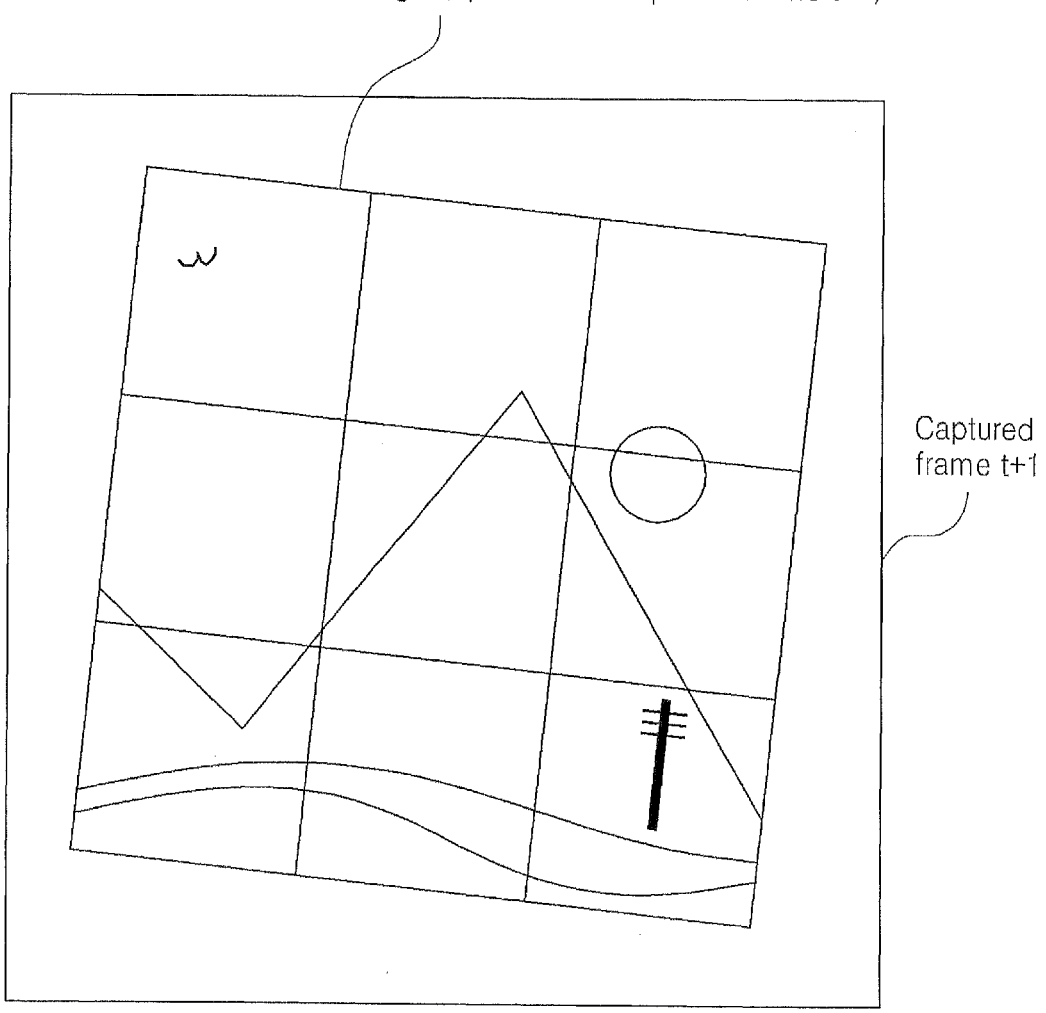

FIG. 1C shows each selected feature point of the current frame $F_t$ having a motion vector (arrows). The motion vectors of the selected feature points shown in FIG. 1C may be calculated by performing the steps of a method illustrated in FIGS. 6 and 7.

FIG. 1D shows that motion vectors in the scene have been grouped (e.g., group A, group B, group C). The motion vectors of actually-stationary objects in the scene (group B, and group C) were caused by camera-movement (e.g., jitter). The grouping of the motion vectors of the selected feature points as shown in FIG. 1D may be performed by the steps of the method illustrated in FIGS. 10A, 10B and 10C and FIG. 11 in which motion vectors are paired/grouped (included or excluded) based on a pairing algorithm using the magnitude ratio and normalized vector difference.

FIG. 1E shows the reference frame $F_{t+1}$ in the greater context of larger captured frame output by an image sensor (not shown). The position of the reference frame $F_{t+1}$ is determined by using the group B and group C motion vectors of actually-stationary objects as shown in FIG. 1D to define the affine coefficients of the reference frame $F_{1+1}$. The image data of the captured frame beyond the bounds of the reference frame may be made available to the circuits that performed the steps of a method illustrated in FIGS. 6 and 7 by which motion vectors of groups B and group C are calculated.

Figure 1F:
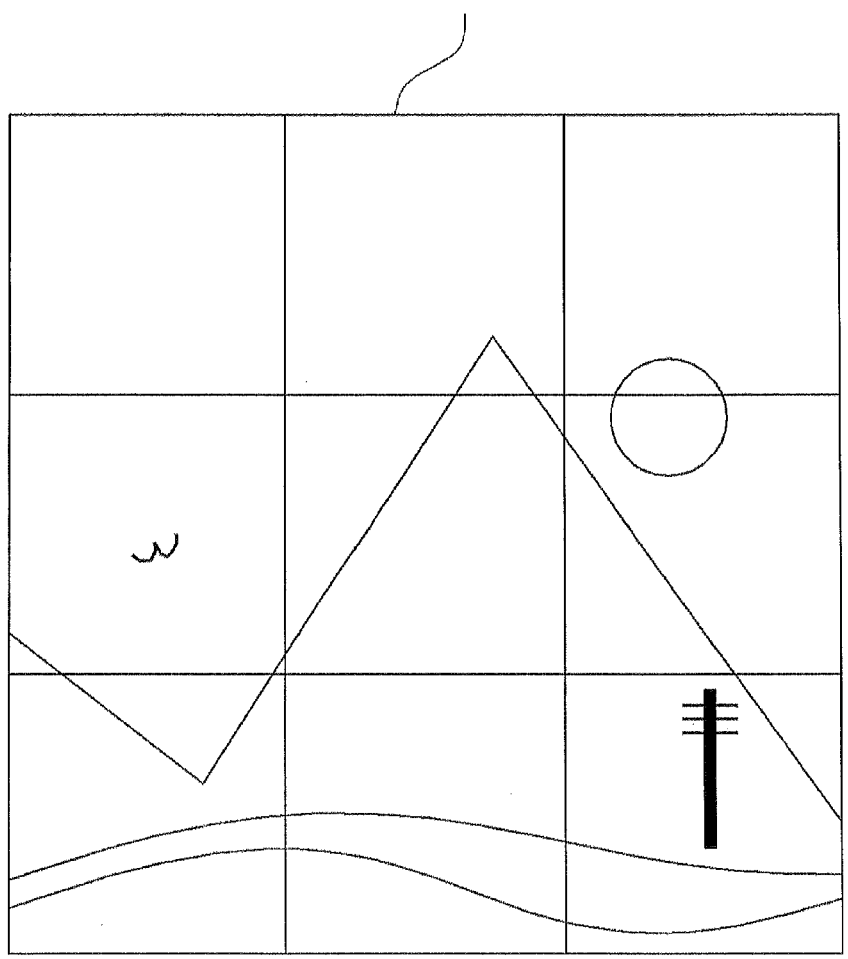

FIG. 1F shows the reference frame $F_{t+1}$ in the position it would have been received by the image sensor (not shown) but for the jittery camera motion indicated by the motion vectors of actually-stationary objects as shown in FIG. 1D. The affine coefficients of the reference frame $F_{t+1}$ have been applied by a compensation circuit (not shown) to rotate and translate the reference frame $F_{t+1}$ to correct for the jittery motion of the camera.

Feature Point Identification, Sorting and Distribution

FIG. 2A is a diagram of the captured frame of the current frame $F_t$ (see FIG. 1E) divided into a border region and a plurality of j×k of tiles in a core region, to facilitate feature point identification and sorting in accordance with a step in the DIS method illustrated in FIGS. 1A through 1F. The boundary lines between the border region and the core region may be predetermined by hardware or by software independently of received image data content, while the bounds of the current frame $F_t$ may be dynamically selected based on the degree of jittery camera motion indicated by received image data content, for example, so as to prevent or reduce over-excursions of the current frame. Thus, the core region may or may not correspond to the dimensions and position of the current image frame $F_t$ shown in FIG. 1A.

Each captured video frame is divided into a small number of non-overlapping tiles (e.g., 4×4 tiles for Standard Definition and 6×6 or longer tiles for High Definition), for the purpose of algorithmically selecting feature points providing a good feature point distribution suitable for digital image stablization. Different regions of the image may have a different density of suitable feature points. In extreme cases, a region of the frame may not have any suitable feature points, for example in the case of a blue sky without any clouds. In other regions, the potential feature points might be very dense. When a global-based threshold is used to identity and select all feature points, the feature points tend to be concentrated in small regions of the image, resulting in poor DIS results. It is still desirable to have more feature points in regions of the image where there is more structure, because there is potentially more interesting motion. In these dense regions another issue is how to ensure that not all feature points are lumped together. Thus an aspect of the present inventive concept provides an efficient method to ensure a minimum distance (MIN_DIST) between feature points to be used for DIS.

For the stability of the DIS algorithm, feature points are distributed as widely as possible, while at the same time limiting the total number of feature points. A "good distribution" of feature points can be expressed as follows: It has a large convex hull; feature points are not too close (MIN_DIST) to one another; in tiles with fewer suitable feature points, at least a minimum number (min_features) of feature points are chosen, if possible; and, in tiles having more of suitable feature points, more feature points (max_num_features=min_features+max_plus_features*(tile_variance $\sigma^2$/total_variance)) are selected.

The maximum number of feature points in each tile (max_num_features) is determined based on the tile's luminance variance $\sigma^2$.

In one embodiment, the maximum number of feature points in each tile (max_num_features) is the sum of a programmable minimum number of feature points per tile (min_features), plus the programmable maximum number of additional feature points (max_plus_features), multiplied by the ratio of the variance $\sigma^2$ of the specific tile over the sum of the tile variances. A correction factor can be applied if the tiles have different sizes. Thus, the maximum number of finally selected feature points per tile may alternatively be min_features plus the part of var_features that is proportional to the tile variance $\sigma^2$, normalized by the corresponding tile weight. Border tiles may be given a higher weight because they include the border region and are therefore larger. In this alternative case, the maximum number of feature points for a given tile is calculated as follows:

$$\text{max\_num\_features} = \text{MIN\_FEATURES} + \left[ \text{VAR\_FEATURES} \frac{\text{WEIGHT(tile)}\sigma^2_{256}(\text{tile})}{\sum_{t \in tiles} \text{WEIGHT}(t)\sigma^2_{256}(t)} \right]$$

Thus, the maximum number of selected feature points (max_num_features) is not kept constant in all tiles, nor kept constant between frames $F_t$ to frame $F_{t+1}$.

In one embodiment, the maximum number of feature points (max_num_features) in each tile is a function of the variance $\sigma^2$ of the luminance data in each tile divided by the overall luminance variance, requiring a prior calculation of the luminance variance $\sigma^2$ of each tile and the total variance of the frame. One ordinarily skilled in the art can readily appreciate that other functions are possible as well; for example, functions involving the average luminance value as well as the tile variance $\sigma^2$.

To identify feature points a corner detector such as a Harris Corner Detector or the like may be used. The Harris Corner Detector evaluates every pixel of the image as a possible feature point candidate. Preferred feature point candidates are points where the feature quality estimation function has a local maximum. The disclosed method of feature point selection optimizes the selection of feature points identified by the Harris Corner Detector by comparing the resulting value of each identified feature point (estimating how well suited this pixel is as a feature point) to a LOCAL rather than a GLOBAL (full-frame) threshold. Thus, the disclosed method takes into account feature point density at each local area and also differences in contrast in different parts of the frame.

The obtained feature point distribution is based on small regions of the video frame, (e.g. non-overlapping tiles), where the number of feature points in each tile increases linearly with the variance $\sigma^2$ of the luminance image data of the tile. Tiles with more interesting image data and therefore the need for more feature points are expected to have a higher variance $\sigma^2$.

Figure 4A:
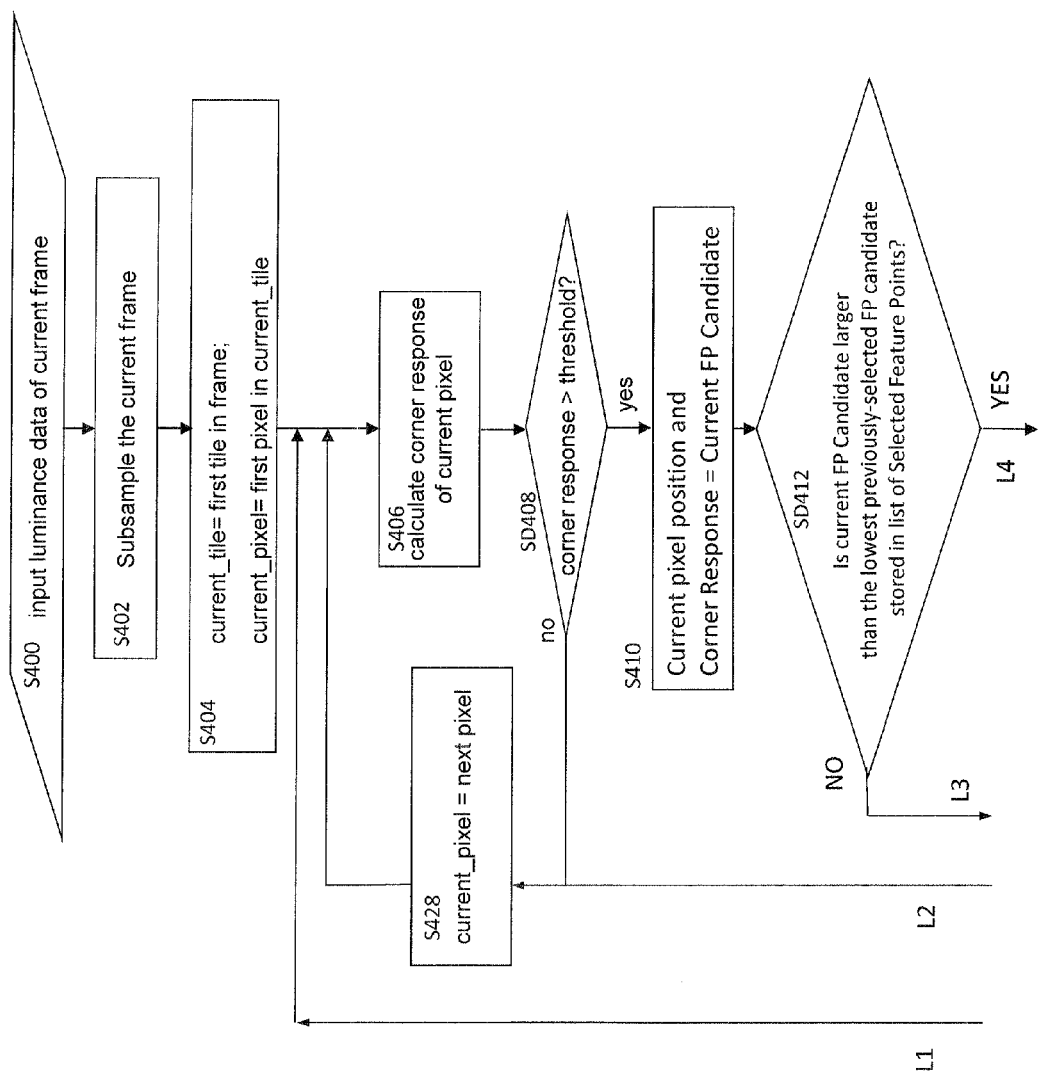

FIGS. 4A and 4B are flow diagrams that illustrates a method of determining a minimum distance (MIN_DIST) between feature points in each tile, while at the same time requiring only little local state information, thereby reducing the hardware implementation costs.

FIG. 2B is a diagram of one tile in the core region of the image frame of FIG. 2A, illustrating Selected (grey), Rejected (white), and previously-selected-but-Cancelled (grey but X'ed) feature points. The feature points shown as small squares in FIG. 2B have been identified as feature point candidates using the Harris Corner Detector algorithm and then sequentially selected, rejected or cancelled in raster scan order, in accordance with steps in the method illustrated in FIGS. 4A and 4B.

For each tile a maximum number (max_num_features) of identified feature point candidates are selected. According to an embodiment of the present inventive concept, each identified feature point candidate can be selected, e.g., in raster scan order by:

i. Identified feature point candidates are pixels where the Harris Corner estimation function exceeds a programmable threshold and where this estimation has a local maximum. To qualify as a local maximum, the value at the location in question must be greater than the value of all direct and diagonal neighbors that precede this pixel in scan order, but only greater than or equal to the value of the direct and diagonal neighbors that follow this location in scan order. This is done to accommodate the fact that identical values are quite likely.

ii. Once a feature point candidate has been identified, it will be entered into a data storage structure (e.g., a sorted list, but other implementations are possible) that can hold a predetermined maximum number of feature point candidates for each tile, e.g., a maximum of 32, 48, 64, or higher finally-selected feature points, provided there is no feature point candidate with a higher estimation function value that is within the programmable lockout range (MIN_DIST). For purposes of illustration, a maximum of 32 is selected to describe the present embodiment.

iii. If a later-identified feature point candidate has been stored in the data structure, all other feature point candidates having a smaller estimation function value that are closer to this point than the lockout range (MIN_DIST) are removed from the data storage structure.

For purposes of illustration, suppose the predetermined maximum number of feature point candidates of tile (5,4) is four (i.e., max_num_features=four). As shown in FIG. 2A, tile (5,4) contains four finally-selected feature points (grey) SFP3, SFP4, SFP5 and SFP7 in raster scan order, and three previously-selected-but-Cancelled feature points (grey but X'ed) SFP1, SFP2, and SFP6, plus two rejected (never-selected) feature points (white). The cancelled previously-selected feature points (grey but X'ed) SFP1, SFP2, and SFP6 were feature point candidates that were selected as feature points in raster scan order during the progress of the method illustrated in FIGS. 4A and 4B, but were subsequently cancelled as selected feature points either because they were within the exclusionary zone (MIN_DIST) of a larger feature point candidate that was later identified as a feature point candidate and selected, or because the list of selected feature points became full (i.e., the number of selected feature point candidates SFP_count=max_num_features) and the earlier-selected feature point was the smallest among the list of selected feature points and was smaller than a feature point candidate that was later identified and selected.

The cancelled previously-selected feature point SFP1 was the first feature point to be identified and selected in raster scan order in accordance with steps in the method illustrated in FIGS. 4A and 4B. Later, cancelled previously-selected feature point SFP2 was identified and selected, but after SFP2 was selected, selected feature point SFP3 was identified and was larger than SFP2. Since SFP2 is within the exclusionary zone (MIN_DIST) of larger, selected feature point SFP3, SFP2 was immediately cancelled when SFP3 was selected. After SFP3 was selected, a feature point candidate was identified in the lower right corner of the exclusionary zone (MIN_DIST) of SFP3, and because that feature point candidate was smaller than SFP3 and within its exclusionary zone, it was immediately rejected (i.e., not selected). Then, a feature point candidate was identified below and just outside of the exclusionary zone (MIN_DIST) of SFP3, and it became selected as SFP4 (and was not afterwards cancelled). Then, a feature point candidate was identified further below and to the right of the exclusionary zone (MIN_DIST) of SFP3, and it became selected as SFP5 (and was not afterwards cancelled as it was close to but not within the exclusionary zone of SFP7). Then, a feature point candidate was identified below and to the right of the exclusionary zone (MIN_DIST) of SFP5, and it became selected as SFP6 (but was afterwards cancelled as it was within the exclusionary zone of larger later-selected feature point SFP7). When SFP6 became selected, the list of selected feature points was already "full" (e.g., the maximum number of feature points for this tile was four), and because SFP1 was the smallest among the list of then-selected feature points SFP1, SFP3, SFP4, and SFP5, and because SFP6 was larger than SFP1, SFP1 was cancelled. Then, a feature point candidate was identified below and within the exclusionary zone (MIN_DIST) of SFP6, and it became selected as SFP7 (because SFP6 was immediately cancelled because selected feature point SFP7 is larger than SPF6 and/or because the list was full etc.). Then, a feature point candidate was identified below and within the exclusionary zone (MIN_DIST) of SFP7, and it was rejected (not selected) because that last feature point candidate is smaller than SFP7. It is possible that SFP7 is actually smaller than cancelled SFP2 (if SFP3 is much larger than SFP7) but a good distribution of feature points has been obtained. The programmable lockout range (MIN_DIST) ensures that finally-selected feature points are not clustered too close together.

The pixel luminance variance $\sigma^2$ of each tile may be determined during the downscaling process in which each the is downsampled. The maximum number feature points in each tile is determined as the sum of a programmable constant minimum number of feature points per tile plus the number of total variable feature points multiplied by the ratio of the variance $\sigma^2$ of the specific tile over the sum of the tile variances. A correction factor may be added for the area of the edge and corner tile regions, as the feature points can also be in the border region. For each tile, up to the maximum number of feature candidates are collected and stored using a sorting process, i.e., selecting, rejecting, canceling described above, for each feature point candidate identified in raster scan order. Last, the final-selected feature point candidates for each tile are simply the feature point candidates with the highest estimation function response, the maximum number of which has been predetermined. There may be instances where there are not enough feature point candidates available in a given tile, such as a tile of low contrast image data, in which case the resulting number of feature points finally used will be smaller than the programmed minimum number (e.g. a smaller number than min_features).

Thus, a method of processing feature point candidates in raster scan order is provided wherein a list comprising at most the calculated maximum number of selected feature points not clustered too close together is maintained even while more new feature point candidates may be later identified and selected. This raster scan order method of sorting feature points has the advantage of reducing the amount of memory and computation compared to various other methods of prioritizing and selecting from among identified feature point candidates. For example, in an alternative embodiment, all feature point candidates of a tile might be identified and stored in a large list stored in a memory, and then only after all the feature point candidates of a tile have been identified, a mathematical sorting algorithm might be applied to find the optimal set (of a predetermined maximum size) of the largest feature point candidates that are not within the exclusion zone (MIN_DIST) of any other member of the set. However, such a sorting algorithm requires more physical memory (to store the entire list of identified feature point candidates of a tile) and potentially requires more total computation than the raster-order sorting (selecting, rejecting, canceling) method of FIGS. 4A and 4B, exemplary results of which are shown in FIG. 2B. The raster scan order sorting algorithm of FIGS. 4A and 4B does not necessarily provide a set of selected feature points that is a global optimum, since a feature point candidate can be canceled from the list by a feature point candidate that is later selected but later cancelled itself, but rather provides an algorithm that can be implemented in hardware with limited local storage. Although the method of FIGS. 4A and 4B are described as processing identified feature point candidates in "raster scan order" (i.e., from left to right and from top to bottom) which is the pixel order that Harris Corner Detector ordinarily proceeds, any sequence of selection of feature point candidates can be employed by the method, such as discontinuous sequences of non-adjacent feature point candidates, as long as all feature points are identified and are ultimately sorted sequentially.

Figure 3:
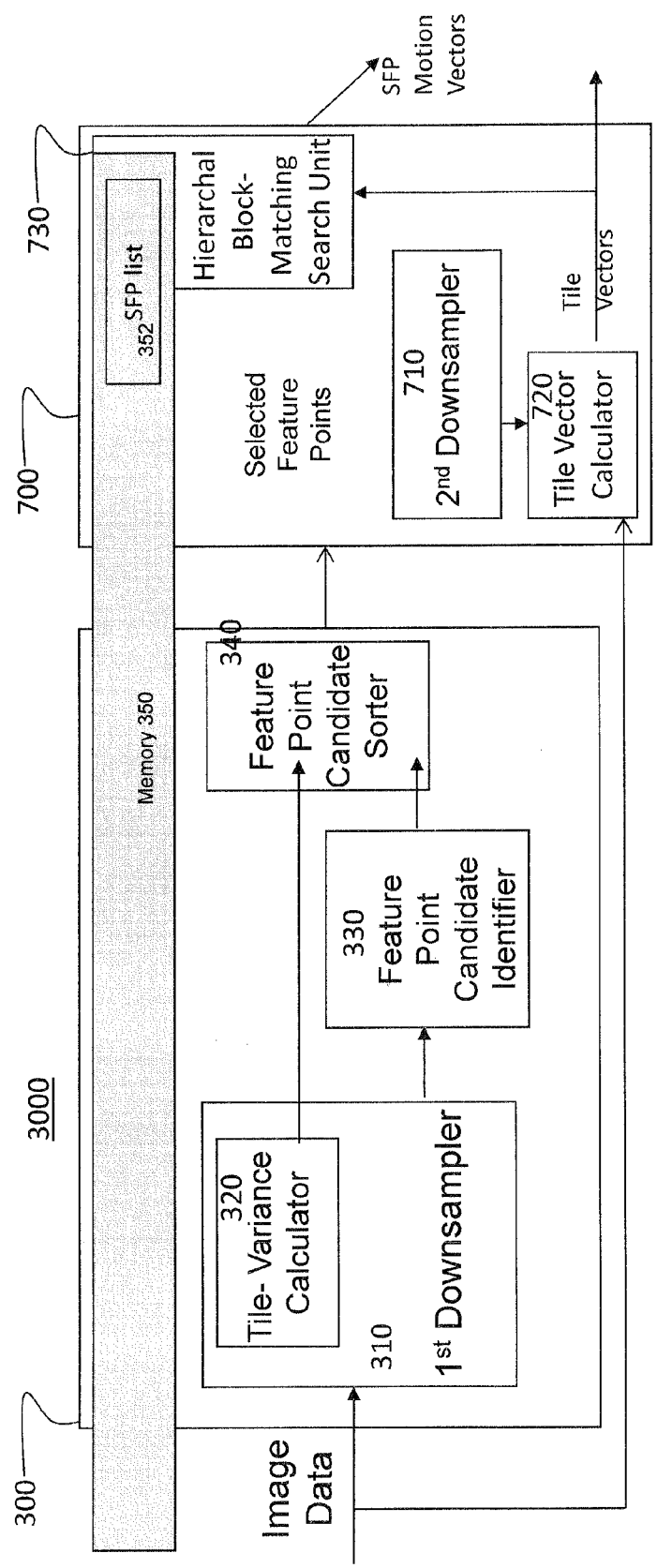
FIG. 3 is a diagram of circuit blocks configured to perform DIS processes according to embodiments of the present inventive concept.

FIG. 3 is a block diagram of Feature Point Circuit according to an embodiment of the present inventive concept. Feature Point Circuit 3000 comprising a Feature Point Selector 300 and a selected feature point (SFP) Motion-Vector Calculator 700 and a shared RAM Memory 350. The Feature Point Selector 300 comprises a Downsampler 310, a Feature Point Candidate Identifier 330, and a Feature Point Candidate Sorter 340.

The Feature Point Candidate Identifier 330 identifies feature point candidates using a Harris Corner Detector algorithm and outputs the identified feature points, e.g., in pixel locations and Harris Corner responses, in raster scan order one tile at a time, to the Feature Point Candidate Sorter 340. The Feature Point Candidate Sorter 340 is configured to perform the method of seriatim sorting of identified feature points of each tile of FIGS. 4A and 4B as further illustrated in FIGS. 1B and 2B. The Downsampler 310 includes a Tile-Variance $\sigma^2$ Calculator 320 functional block that calculates the tile-variance $\sigma^2$ of each tile of the image frame, according to the equation:

$$\sigma^2 = \frac{\Sigma y^2}{N} - \left(\frac{\Sigma y}{N}\right)^4$$

where the y values are the luminance values within the tile and N is the number of pixels in the tile.

The circuit as shown in FIG. 3 may be implemented in a semiconductor chip, having input/output pins configured to receive image data from a camera having sensors that capture images and circuitry to convert the captured image into image data. Data processed by the circuit of FIG. 3 are output via the input/output pins to other components of the camera. As will be further described below, the memory 350 resides within the semiconductor chip and to minimize the size of the chip, the memory need to be small in physical size and therefore storage capacity is limited. To save computational power and to reduce the number of required operations, the Feature Point Selector 300 may operate only on luma data, which will be horizontally and vertically subsampled by the Downsampler 310 by a factor $f_{s1}$ of 2, 4, or 8 (a factor $f_{s1}$ of 4 is chosen from the present embodiment). The $f_{s1}$ downsampled luma data is used for feature point identification by the Feature Point Candidate Identifier 330, and in alternative embodiments may be later used for the feature point motion-vector estimation by the Hierarchical Block-Matching Search Unit 730 of the SFP Motion-Vector Calculator 700. While the smaller downsampled image is calculated by the Downsampler 310, the luminance variance (tile-variance) $\sigma^2$ of each tile is calculated, and global maxima of the smaller eigen-value of the 3×3 Harris corner matrix are identified. Both the tile offset, which is the coordinate of the upper left pixel of the upper left tile, and the tile pixel dimensions are preferably multiples of the largest subsampling factor ($f_{s2}$) used. It is also preferred that the image core region is centered in the overall image. Therefore, the width of the left border region is identical to the width of the right border region and the height of the upper border region is the same as the height of the lower border region. (see FIG. 2A)

Once the input frame luminance data has been subsampled and stored in the RAM memory 350, the Feature Point Candidate Identifier 330 reads it back in tile order and sequentially feeds identified feature point candidates into the Feature Point Candidate Sorter 340. For the feature point identification process of block 330, the statistics area of potential feature points in the tiles adjacent to the border area extends into the border area, and thus the pixels of each border region tile are processed together with the pixels of the adjacent tile. The pixel data is read within each tile in raster scan order: Lines from top to bottom, pixels within each line from left to right.

To process each tile, the Feature Point Candidate Identifier 330 needs three additional pixels on each internal tile border for feature point identification, using the Harris corner detector. Consequently, these pixels will be read more than once. Identified feature point candidates are pixels in each tile where the lower eigenvalue λ1 of the Harris matrix has a local maximum. To qualify as a local maximum, the corner response of the pixel in question must be greater than the corner response of the upper left, upper, upper right, and left neighbors and greater than or equal to the corner response of the right, lower left, lower, and lower right neighbors. With this definition, at least one point of a larger region with the same constant corner response will be identified as potential feature candidate. The detection logic for the local maxima will require two line buffers of corner responses. Points with a local corner response maximum are first compared with a programmable corner response threshold. If the corner response of the point in question is smaller than this threshold, it is ignored. Otherwise, the feature point's coordinates and its corner response are presented to the Feature Point Candidate Sorter 340.

The Feature Point Candidate Sorter 340 keeps track of up to max_num_features (e.g., 32) feature point candidates having the highest corner response in each tile, while simultaneously ensuring that all feature points have a minimum programmable distance (MIN_DIST) from one another. The distance used in the above algorithm between two points is defined as follows:

$$dist\left(\begin{pmatrix} x_1 \\ y_1 \end{pmatrix}, \begin{pmatrix} x_2 \\ y_2 \end{pmatrix}\right) = \max(|x_1 - x_2|, |y_1 - y_2|)$$

The sorting in the method of FIGS. 4A and 4B are done with operations taking into account only the current contents of the sorter's list of selected feature points and of the incoming feature point candidate and making a decision right away. Therefore, the Feature Point Candidate Sorter 340 adapted to perform the method of FIGS. 4A and 4B will not inherently calculate the global optimum, and the results will depend on the order in which the incoming feature point candidates are presented.

Feature Point Candidate Sorter 340 outputs the selected feature points seriatim and they are stored in a SPF list in a portion of the memory 350 of the circuit of FIG. 3.

FIGS. 4A and 4B are flow charts of a method of identifying and selecting a plurality of Feature Points in each tile of the image frame of FIGS. 1A and 2A, for performing steps in the DIS method illustrated in FIGS. 1A through 1F. The method begins with data input step S400 in which luminance data of a current frame $F_t$ are received, followed by downsampling step S402. Initialization step S404 resets the tile counter value current_tile and the pixel counter current_pixel.

Next, Harris Corner Detector is performed (steps S406, SD408, and S410) in raster scan order upon each pixel of the downsampled luminance data of the current_tile as current_pixel as the incremented (step S428). Each time the current_pixel's corner response exceeds a local maxima or threshold, (i.e., the "yes" branch of decision step SD408) the current_pixel is identified as the current FP (feature point) candidate (step S410) and is then immediately subjected to the feature point sorting algorithm (SD412, SD414, SD416, S417, SD430, S418, S420).

The feature point sorting algorithm SELECTS (S420) the current FP candidate only if it is larger than lowest previously-selected FP candidate already stored in list of Selected Feature Points. (Yes branch of decision step SD412), else the current FP candidate is REJECTED (Rejection step S417) without ever being selected (No branch of decision step SD412]. If the list of selected feature points is already full, as indicated by the selected feature point count SFP_count, (i.e., SFP_count=max_num_features=min_features+max_plus_features*(tile_variance/total_variance)) when the current FP candidate is SELECTED, then CANCEL the smallest previously-selected FP candidate from the list (SD430), elsewise increment the SFP_count value (SD430).

The feature point sorting algorithm SELECTS (S420) the current FP candidate only if it is not within the exclusionary zone (MIN_DIST) of any larger (SD416) previously-selected feature point already on the list (SD414). Thus, if the current FP candidate is within MIN_DIST of any larger (SD416) previously-selected feature point already on the list (SD414), it is REJECTED (No branch of decision step SD416, and Rejection step S417) without being selected. On the other hand, if the current FP candidate is within MIN_DIST of any smaller (SD416) previously-selected feature points already on the list (SD414), all the smaller (SD416) previously-selected feature points are CANCELLED (Yes branch of decision step SD416, and Cancellation step S418), and the current FP candidate is SELECTED (S420), and the SFP_count is updated (e.g., decremented or left the same) accordingly (418).

Once the current FP candidate has been SELECTED (S420) or REJECTED (S417), the Harris Corner Detector outputs the value of the next (S428) current_pixel (S410) of the current_tile (SD422) and the next identified PF candidate is immediately subjected to the feature point sorting algorithm (SD412, SD414, SD416, S417, SD430, S418, S420), etc. If the last pixel of the current_tile has been processed (SD422), then the next tile (SD424, S426) is processed. If the last tile has been processed, then the process is DONE until the next image frame is to be processed.

Feature Point Motion Vector Calculation

After the feature points of each tile in the current frame $F_t$ have been identified and sorted, the next step in the DIS method of FIGS. 1A through 1F is to obtain motion vectors for each of the selected feature points.

Block matching algorithms (BMA) used for calculating the motion vectors of feature points are well known. In block matching, an error function (e.g. SAD, MAD, MSE) is calculated for all possible positions of a block in a target area of the reference frame. The position with the lowest result of this function is used to calculate the estimated motion vector. Block matching is computationally expensive. There are several known ways to reduce the computational cost. Hierarchical or multi-resolution block matching is one of these ways in which the global movement is calculated first at lower resolutions. The resulting vectors will be used to search a smaller range at higher resolutions, thereby reducing the total number of arithmetic operation needed.

For most applications and for video encoding in particular, accurate motion vectors are needed for all blocks of a frame. Consequently, the search range in the later stages is usually relatively large. In the digital image stabilization (DIS) method illustrated in FIGS. 1A through 1F, it is only necessary to estimate the relative movement of feature points (e.g., of actually-stationary objects) from one frame to the next. For purposes of image stabilization, accurate motion vectors representing the movement of the background and large objects are needed, whereas smaller objects do not need to have an accurate motion vector associated with them. Any inaccurate vectors for smaller objects can be filtered at a later stage of the DIS algorithm.

It is expected that feature points of the large stationary objects of significance in the DIS method will move in a coherent way because of global movement or camera movement. We recognize that sufficiently large objects that move independently cover the majority of at least one tile, so that their motion can be estimated as the predominate motion of the tile itself, while the motion of small objects has little affect on the motion vector of the tile itself. Thus, the process of calculating motion vectors may be modified to reduce computations, by using a hierarchical motion estimation algorithm and by preferring tile movement over local movement, using the motion vector of the tile. Thus, a first step is to divide the current image frame into a plurality j×k of tiles. (This first step shall have already been performed for the purpose of feature point selection as above described in regards to FIGS. 1B and 2A).

A second step of calculating the motion vectors of the feature points accurate enough for DIS would be to derive one motion vector per tile, using block matching on the lowest resolution. In this step, the SAD (sum of absolute differences) for a given tile is calculated. The motion vector for a given tile is the one that minimizes the SAD. The SAD (sum of absolute differences) for a given motion vector candidate v=(vx, vy) is defined:

$$SAD(v_x, v_y) = \sum_{(x,y) \in tile} |ref(x, y) - \text{search}(x + v_x, y + v_y)|$$

By using a low resolution downsampled image, computation is reduced and the effect of small objects in the scene is further reduced.

In the third step, the motion vectors of the tiles will be used in a block matching algorithm as start vectors for the local search for the motion vector of the feature points in each tile. Because a sufficiently large object that covers the majority of at least one tile may extend into adjacent tiles, it is probable that some feature points in each tile may be associated more strongly with the motion vector of an adjacent tile rather than the motion vector of the tile they are found within. Thus, it would be effective to use the motion vectors of all the adjacent tiles as multiple start vectors in the block matching search for the motion vector of the feature points of any given tile. The tiles used here are centered in the frame with a border region of a size of at least the maximum supported motion vector, such that the motion search for all feature points in all tiles can be done without referring to pixels outside the frame.

Figure 5:
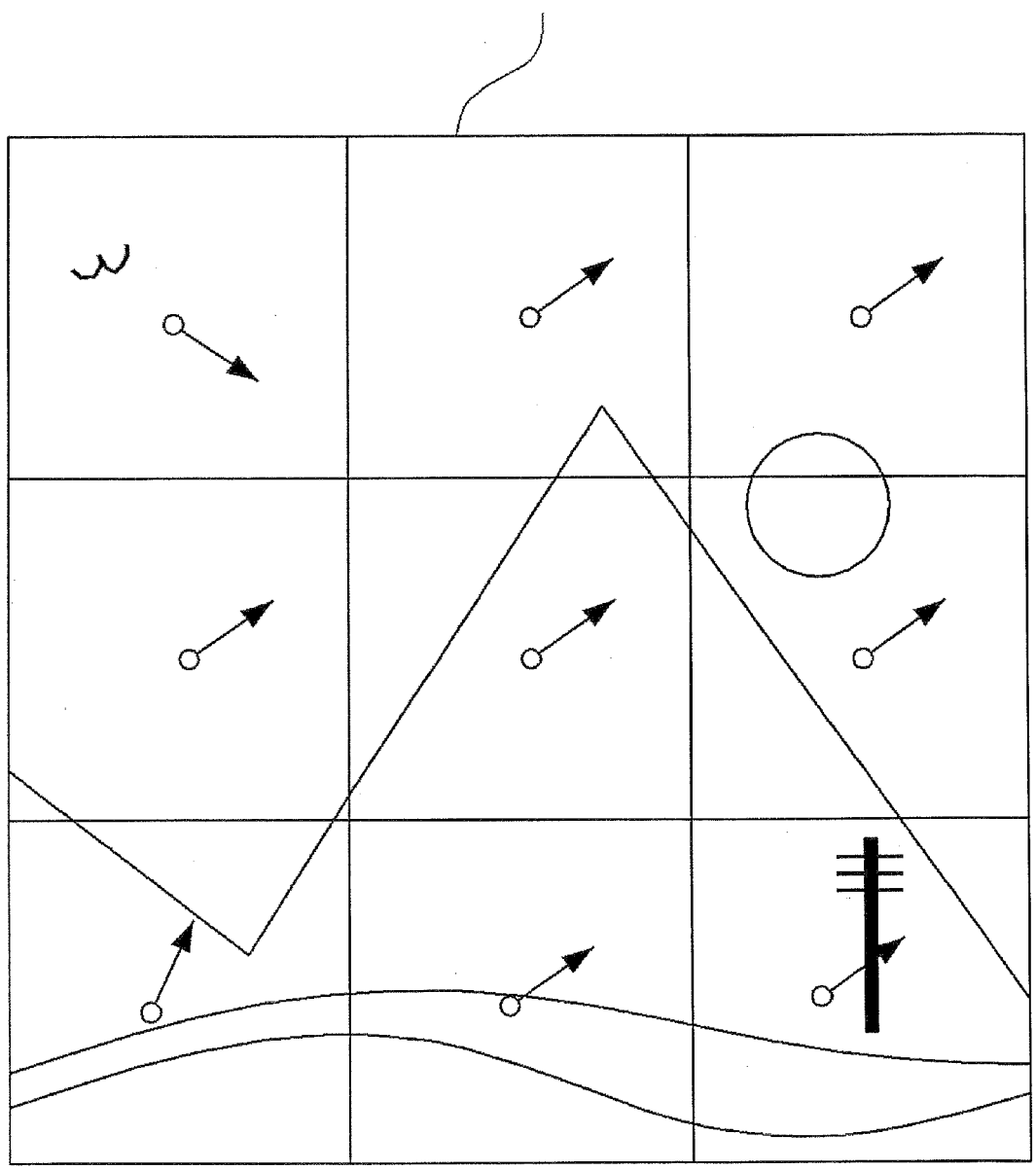
FIG. 5 is a view of the current frame $F_t$ of FIG. 1A downsampled with tile motion vectors superimposed thereon, for illustrating motion vector calculation steps in the DIS method illustrated in FIGS. 1A through 1F.

FIG. 5 is a view of the current frame $F_t$ of FIG. 1A downsampled with calculated tile motion vectors superimposed thereon, for illustrating motion vector calculation steps in the DIS method illustrated in FIGS. 1A through 1F. The smaller (less pixels, less data) image in FIG. 5 is derived from the original current captured frame or from the previously subsampled image thereof (step S402 of FIGS. 4A and 4B) by subsampling both horizontally and vertically. Subsampling by a subsampling factor $f_{s2}$, e.g., 4, is used for global (tile) motion estimation. The 4×4 downsampling just averages 16 pixels (with rounding), without any overlap on the input side. Then, a block matching search using each entire subsampled tile is performed to determine each tile's motion vector.

The motion vector for a given tile is the one that minimizes the SAD. In case of a tie, the first one found is taken. The motion vectors will be used as start vectors for the local search for the motion vectors of the nearby feature points. The motion range about each start vector is programmable.

Since the number of operations needed for the tile motion estimation are only about 12% of the operations needed for the local motion estimation, it is sufficient to calculate the sum of about 8 absolute differences per cycle. Therefore, no systolic array is needed.

Figure 6:
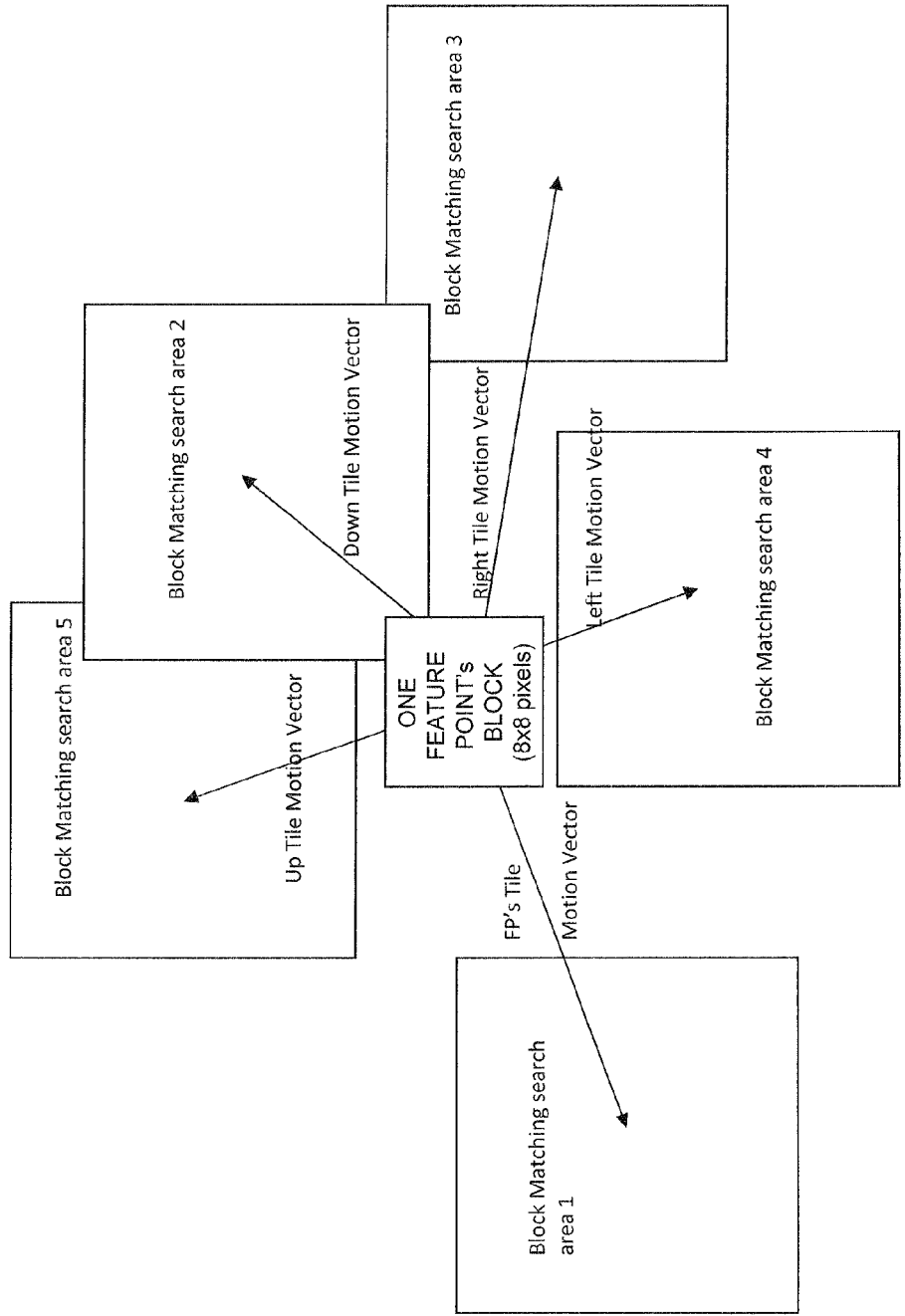
FIG. 6 is a view of a portion of a tile in the downsampled frame of FIG. 5 illustrating using the tile motion vectors of FIG. 5 as start vectors for a block matching search to calculate the motion vector of a selected feature point used in the DIS method illustrated in FIGS. 1A through 1F.

FIG. 6 is a view of a portion of one tile in the downsampled frame of FIG. 5 illustrating using the tile motion vectors of FIG. 5 as start vectors for a block matching search to calculate the motion vector of one selected feature point used in the DIS method illustrated in FIGS. 1A through 1F.

A small local block matching search is performed in a higher-resolution domain around each of a set of start vectors for every feature point in the tile. This step could be performed at the original video resolution, or subsampled by a factor $f_{s3}$ of 2 or 4. The start vectors used are the tile motion vectors that have been determined above. The start vectors used are those of the tile the feature point belongs to as well as those belonging to the four direct neighbors (Upper tile, Left tile, Right tile, Lower tile), provided it exists. Thus, in FIG. 6: the start vector corresponding to Block Matching search area 1 is the feature point's (FP's) own tile's motion vector; the start vector corresponding to Block Matching search area 2 is the block Down below the FP's tile's motion vector; the start vector corresponding to Block Matching search area 3 is the block Right of the FP's tile's motion vector; the start vector corresponding to Block Matching search area 4 is the block Left of the FP's tile's motion vector; and the start vector corresponding to Block Matching search area 5 is the block Up above the FP's tile's motion vector. According to another embodiment, the start vectors of the four diagonal neighbors, are used. Other steps for selecting among start vectors (e.g., to reduce the number of block matching computations) can be performed, particularly if a first group of tile vectors have magnitudes and direction similar to each other suggestive of one large object (see discussion of motion vector grouping regarding FIGS. 8A, 8B, 9, 10A, 10B, 10C). Alternatively, block matching can be performed with priority given or only where the two or more Block Matching search areas overlap, or between those nearest to each other, etc.

Generally, assignment of motion vectors to feature points will proceed tile by tile, and every feature point of a given tile will use the same start vectors (e.g., the same selection of tile motion vectors). However, in various other embodiments, feature points in different parts of a given tile may use a different selection of start vectors, on the premise that a feature point adjacent to tiles in a detected grouping of tile motion vectors may more likely be a visible point on the same object that is commonly found in each member of that group. Thus, a block matching search might first be performed on those feature points near the perimeter of each tile, to detect if they are all or mostly all similar to their own tile's motion vector and/or to the tile motion vector of adjacent grouping of tile motion vectors. If, for example, the motion vectors of all the initially selected feature points (e.g., all those near the perimeter of a given tile, or farthest from its center point) are in the same or similar to their own tile's motion vector, then the set of selected start vectors for the remaining feature points may be reduced.

For each start vector used, we use a very small range for the local search. The goal here is not so much to determine accurate vectors for each and every feature point. Rather, the feature points of interest are those that belong to the background or large objects. For those feature points, one of the tile motion vectors should be good, or close to the motion vector of the feature points of interest, and therefore, a small local search about each selected tile motion vectors is sufficient.

Referring again to FIG. 3, the SFP (selected feature point) Motion-Vector Calculator 700 of the Feature Point Circuit 3000 comprises a second Downsampler 710 for outputting more-downsampled luma data than the first Downsampler 310 for tile vector calculation, a Tile-Vector Calculator 720 for calculating each tile's motion vector, and a Hierarchical Block-Matching Search Unit 730 to determine and output the motion vector of each Selected Feature Point (SFP) received from the Feature Point Candidate Sorter 340 of the Feature Point Selector 300. The second Downsampler 710 outputs the deeply downsampled current frame $F_t$ shown in FIG. 5. The second Downsampler 710 outputs the deeply downsampled luma data of the current frame $F_t$ shown in FIG. 5. Tile-Vector Calculator 720 calculates the motion vector of each tile using the deeply downsampled luma data of the current frame $F_t$ output by the second Downsampler 710. Hierarchical Block-Matching Search Unit 730 determines the motion vector of each of the selected feature points output by the Feature Point Candidate Sorter 340 of the Feature Point Selector 300, using the full-resolution luma data (or the output of the first down-sampler 310) of two consecutive frames, and using the Tile Vectors as start vectors as described above.

Figure 7:
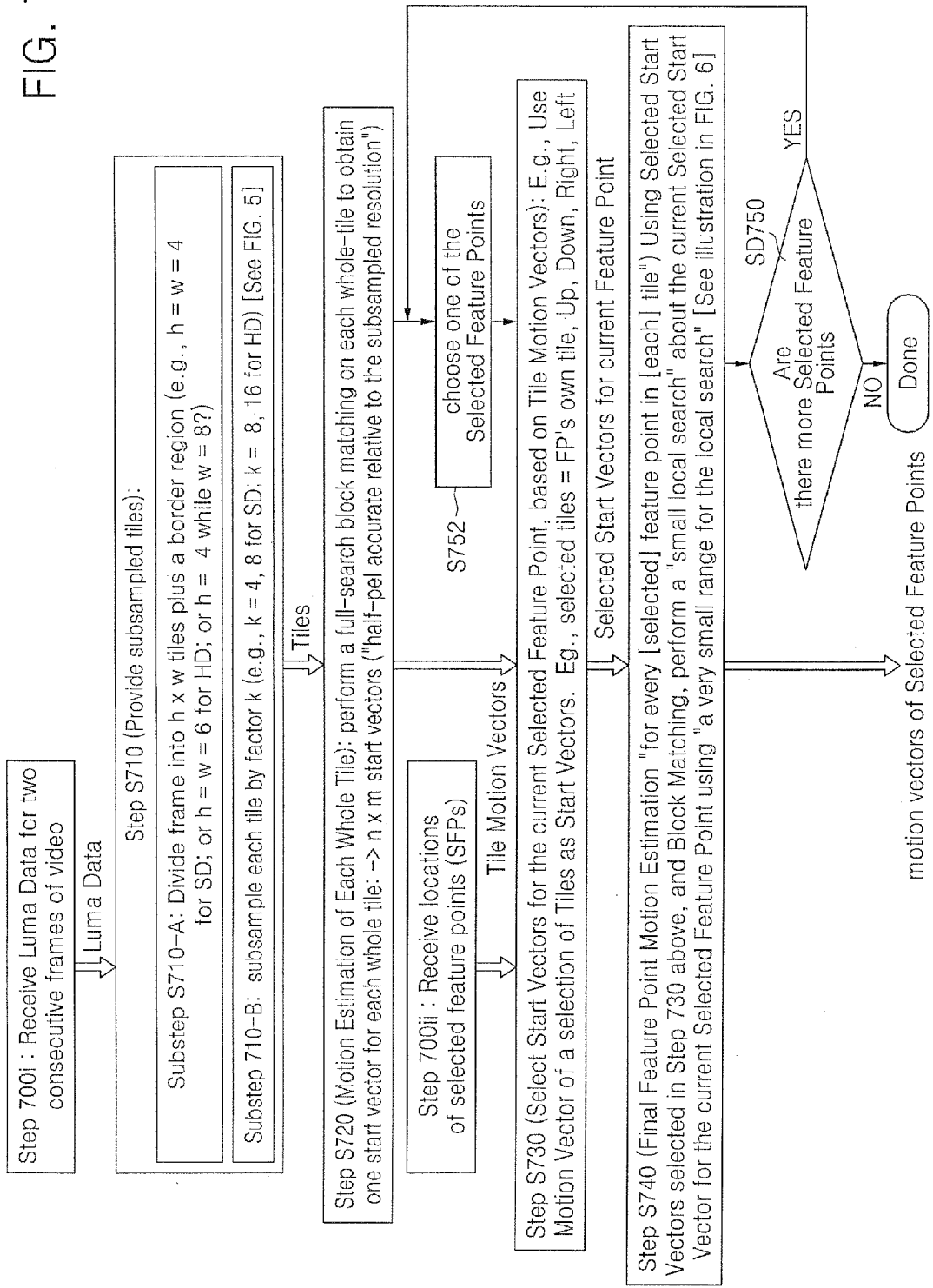
FIG. 7 is flow chart of a method of calculating the motion vectors of the selected feature points in the image frame of FIGS. 1A and 2A, for performing steps in the DIS method illustrated in FIGS. 1A through 1F.

FIG. 7 is a flow chart illustrating a method of calculating the motion vectors of the selected feature points (SFP) in the current frame $F_t$ of FIGS. 1A and 2A, for performing steps in the DIS method illustrated in FIGS. 1A through 1F.

In initial steps, the Hierarchical Block Matching Search circuit 730 shown in FIG. 3 receives luma data of two consecutive frames of video, the current frame and the reference frame (step S700i) and the pixel locations of the Selected Feature Points (S700ii). The current frame $F_t$ is divided into a plurality of subsampled tiles (S710) which can be preferably the same as the tiles previously used in the feature point sorting method of FIGS. 4A and 4B. In substep S710-A the current frame $F_t$ is divided into a plurality j×k of tiles plus a border region as illustrated in FIG. 2A. In substep S710-B the luma data associated with every tile is subsampled by factor $f_{s2}$ (e.g., $f_{s2}$=4, 8 for SD; $f_{s2}$=8, 16 for HD), as illustrated in FIG. 5.

Next, in step S720 the motion vector of each tile is calculated using full-search block matching with the deeply subsampled luma data, as illustrated in FIG. 5, achieving half-pel precision relative to the subsampled resolution. The calculated minimum-SAD values corresponding to calculated motion vectors may be saved for use in other features of the DIS (e.g., to filter out feature points of small objects). In step S730, start vectors are selected for the current Selected Feature Point (SFP) based on the calculated tile motion vectors from step S720, as described herein above. In step S740, a Hierarchical block-matching algorithm is carried out with full resolution luma data and using the selected start vectors based on the tile vectors to determine the motion vector of the current SFP. Steps S730 and S740 are repeated until the motion vector of every SFP in every tile has been calculated (through loop SD 750 and S752).

Feature Point Grouping by Motion Vector Magnitude and Direction

Motion between video frames is detected by calculating motion vectors of identifiable "feature points" in adjacent frames. Motion vectors of feature points may then be "grouped" for the purpose of identifying moving-objects within the scene, as distinguished from global motion of the camera/scene. The global motion of the camera/scene is analyzed to distinguish between intended (e.g., panning) and unintended (jittery) global motion.

If there is no camera motion (no camera trajectory) then each detected Feature Points of actually-stationary objects (e.g., the corners of rocks, the peaks of mountains) will be expected to be found in the same location in each of two or more consecutive frames, and the motion vector of all those detected Feature Points will be measured as null. However, if there is camera motion, then the vectors of the many Feature Points of any given actually-stationary object may have different magnitudes and direction. A Digital Image Stabilization circuit may be used to correctly "group" a plurality of motion vectors (of Feature Points) so that they are attributed to the same actually-stationary object.

Usually camera movements are the mixture of translational and rotational movements, and the distance from camera to the objects in the scene varies. While translational camera motion contributes the magnitude differences of motion vectors based on the object distance from camera, the rotational camera motion contributes both of magnitude and direction of motion vectors.

Figure 8B:
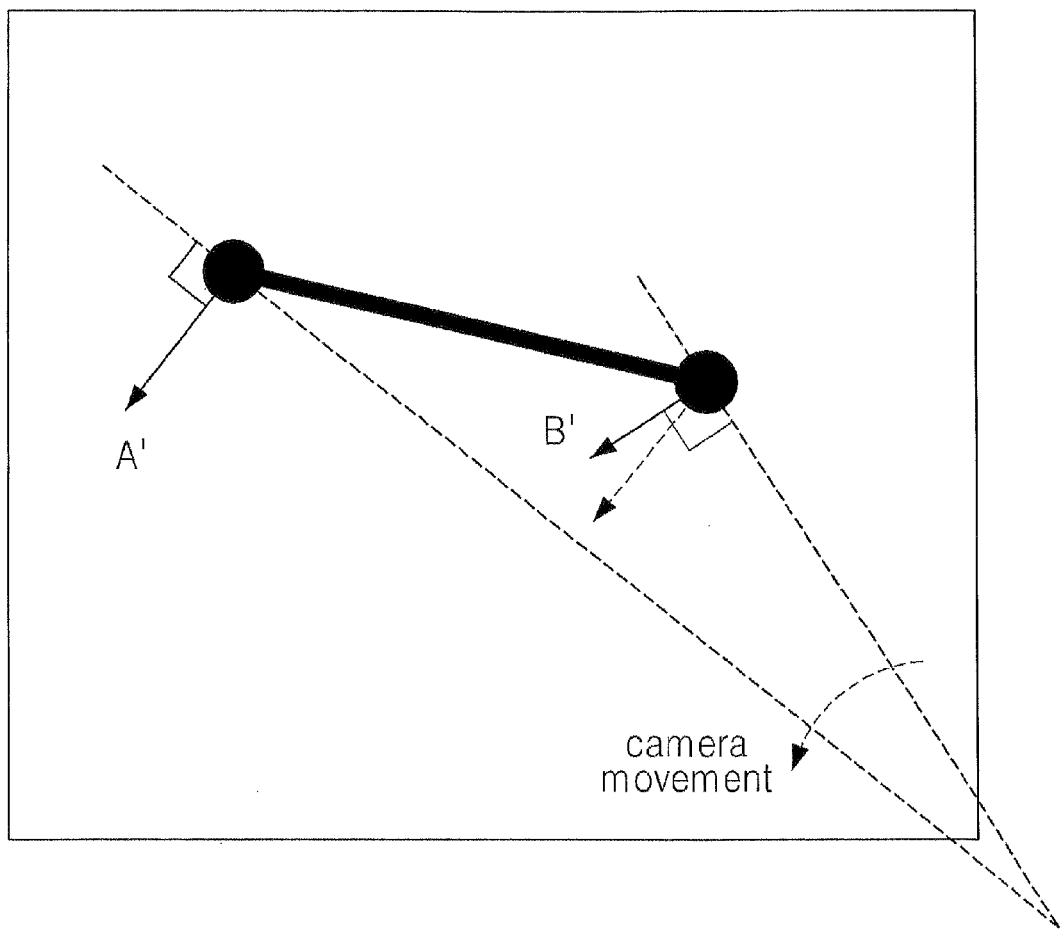
FIG. 8B is a diagram of motion vectors of two feature points of actually-stationary objects at the same distance from the camera when the camera has a rotational component.

FIGS. 8A & 8B illustrate the different vectors that result from rotational camera motion as compared with purely translational vector motion. In the figure, assume two selected feature points SFP4 & SFP5 of the same stationary physical object are physically the same distance from camera, and vector A is the motion vector of SFP4 and B is the motion vector of SFP5 in the case of purely translational camera motion, and vector A' is the motion vector of SFP4 and B' is the motion vector of SFP5 in the case including rotational camera motion.

With purely translational camera motion vectors A & B will have exactly the same motion vectors, but vectors A' & B' have different magnitude and different direction due to the rotational camera motion, even though they are in the same distance from the camera.

Figure 8C:
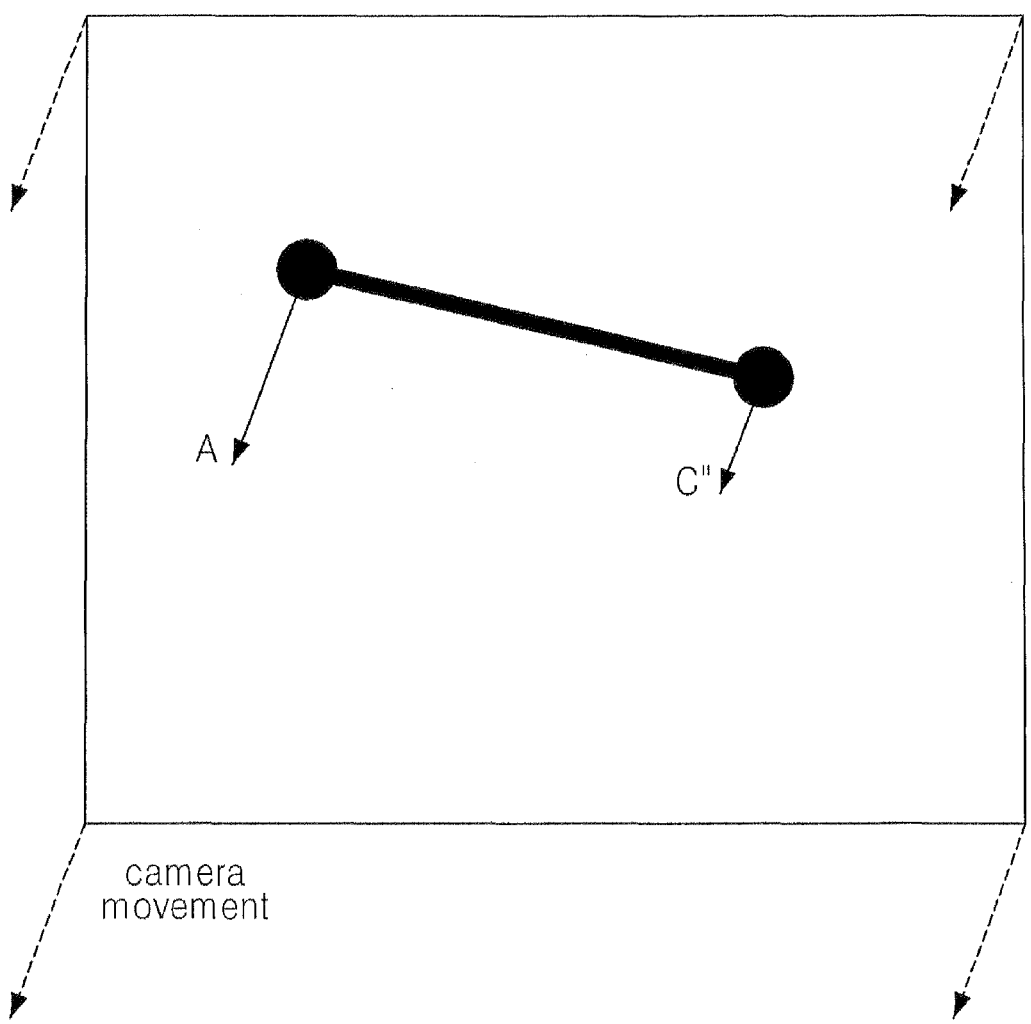
FIG. 8C is a diagram of motion vectors of two feature points of the same actually-stationary object at different distances from the camera when the camera has only translational movement and no rotational component.

FIG. 8C illustrates the different vectors that result from purely translational vector motion in the case where two feature points of the same stationary object are different distances from the camera. Assume two selected feature points SFP4 & SFP7 of the same stationary physical object are different physical distances from the camera, and vector A is still the motion vector of SFP4 and vector C" is the motion vector of SFP7 in the case of purely translational camera motion. Because SFP7 is closer to the camera than SFP4, while they are points on the same stationary object, the magnitude of their motion vectors are different (vector C" is bigger than vector A)

Thus, while grouping motion vectors, a margin of vector difference is needed to account for the vector magnitude and vector direction (angle) differences caused by these factors so that the motion vectors of all the feature points of the same stationary object can be grouped together. The usual way of detection of motion vector groups, with an error margin and use of simple motion vector differences, is to define an error threshold.

The magnitude of motion vector difference ΔM is the measurement that may be used as the basis for grouping decisions, and the error margin $Th_{\Delta M}$ may be defined as:

$$\Delta M = \text{SQRT}((xa-xb)^2 + (ya-yb)^2) < Th_{\Delta M},$$

where
A=(xa, ya);
B=(xb, yb); and
$Th_{\Delta M}$ is an error threshold for the magnitude of vector difference ΔM. (a positive number)

The magnitude of motion vector difference method is adequate when the camera movement is purely translational (up, down, and/or side to side) because the motion vectors of all stationary objects' feature points will have the same direction, because they are all defined by the same translational camera movement. As illustrated by comparing FIGS. 8A and 8C the motion vectors of different stationary feature points can also be different due to being different distances from the object(s) to the camera, even in the case of purely translational camera movement. The magnitude differences of motion vectors of feature points of the same stationary object are typically relatively small in the usual video scene, and the magnitude difference can also be tolerated by allowing some margin of vector magnitude difference (|A|−|B|), and the magnitude of motion vector difference ΔM method is adequate in this case.

Figure 9B:
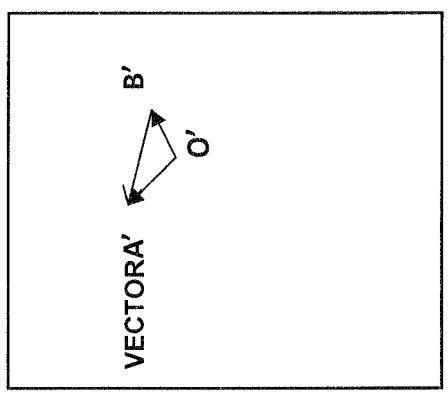
FIGS. 9A and 9B are diagrams of two pairs of motion vectors of feature points of actually-stationary objects in a video scene, for illustrating that each pair may have the same magnitude of vector difference even while the four motion vectors' directions and magnitudes are all different.
Figure 9A:
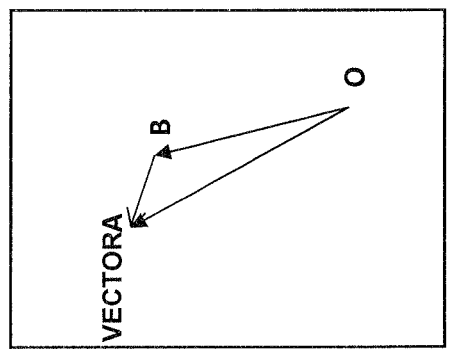

FIG. 9A illustrates a case of two motion vectors A and B in which the magnitude of vector difference ΔM is a good basis for grouping two feature points together.

The magnitude of vector difference ΔM alone may not be good basis for grouping vectors in some cases.

FIG. 9B illustrates a case of two motion vectors A' and B' in which the magnitude of vector difference ΔM' cannot be a good basis for grouping two feature points together.

In FIGS. 9A and 9B, pairs of vectors (A,B) and (A',B') have exactly the same magnitude of vector difference (ΔM=ΔM') as shown. Each of pairs (A,B) and (A',B') can also have its respective magnitude of vector difference ΔM, ΔM' within the error margin $Th_{\Delta M}$. Vector pair A and B can be appropriately grouped together on the basis of the magnitude of their vector difference ΔM. But vector pair A' and B' has too much angular (directional) difference (e.g., compare with the pair A and B), for it to be appropriate to group vector A' and vector B' together in the same group.

The magnitude of vector difference ΔM method by itself may in instances be not suitable for motion vector grouping where two feature points have their magnitude of vector difference within the margin $Th_{\Delta M}$ while they have too much angular (directional) difference. A rotational component of the camera's trajectory can cause one or more feature points of stationary objects to have the same or a similar magnitude, but different directions, which is not detected by the magnitude of vector difference method. Thus, the magnitude of vector difference method may cause incorrect jitter compensation and/or less than optimal video compression, and/or excessive computational power or time consumption, and/or video artifacts due to incorrect video compression of stationary or of moving objects.

The motion vectors of the selected feature points (SFP) output by the Hierarchical Block-Matching Search Unit 730 of the Feature Point Circuit 3000 are next grouped according to their magnitude and direction to associate the motion vectors of selected feature points (SFPs) with objects in the scene based on the object's perceived relative movement between consecutive video frames.

When camera movement has rotational component, such as about an axis orthogonal to the plane of the image sensor/photodiode array, the direction of motion vectors of one object (e.g., the background) cannot be the same. Both of the magnitude and direction of the vectors are different for different feature points of the background, even if they are actually stationary and are the same distance from the camera.

Instead of using only the magnitude of motion vector difference ΔM and the error margin $Th_{\Delta M}$ for the grouping decision, we use the magnitude ratio of motion vectors and normalized vector difference to detect and tolerate some amount of motion vector differences caused by rotational camera motion.

Where vector A=(xa, ya) and vector B=(xb, yb),

A first grouping decision criteria is based on the Magnitude ratio |b| where $$|b|^2=(|B|/|A|)^2=(|B|^2)/(|A|^2)=(xb^2+yb^2)/(xa^2+ya^2)$$

A second grouping decision criteria is based on normalized vector difference (used for the evaluation of angle difference)=|a−b|, where $$|a-b|^2=[\{(xa-xb)^2+(ya-yb)^2\}/(xa^2+ya^2)].$$

Because the first grouping decision is based on magnitude ratio (|B|/|A|) rather than absolute difference (A−B), we use magnitude ratio threshold $r_{th}$ instead of absolute error margin $Th_{\Delta M}$. For grouping decisions, we define lower bound of magnitude ratio threshold and upper bound of magnitude ratio threshold as $Mr_{Lth}$ and $Mr_{Uth}$ respectively.

$$Mr_{Lth}^2 < |b|^2 < Mr_{Uth}^2,$$

where
$Mr_{Lth} \equiv (1-r_{th})$; and
$Mr_{Uth} \equiv (1+r_{th})$; and
$0 < r_{th} < 1$ For example, if we allow 30% of magnitude ratio threshold, $r_{th}$ will be 0.3; $Mr_{Lth}$ will be 0.7; and $Mr_{Uth}$ will be 1.3, resulting in the following range:

$$0.7^2 < |b|^2 < 1.3^2$$

For an angular difference between vector A and vector B not exceeding a threshold of $\theta_{th}$ degrees, the second grouping decision criteria is $$|a-b|^2 < Ma_{th}^2,$$

where $$Ma_{th} = SQRT(1+|b|^2-2*|b|*\cos\theta_{th}); \text{ and}$$

$$|b|=SQRT\{(xb^2+yb^2)/(xa^2+ya^2)\}$$

The grouping method using decisions based on these two grouping decision criteria can perform optimal motion vector grouping even in the presence of rotational camera movement.

Figure 10:
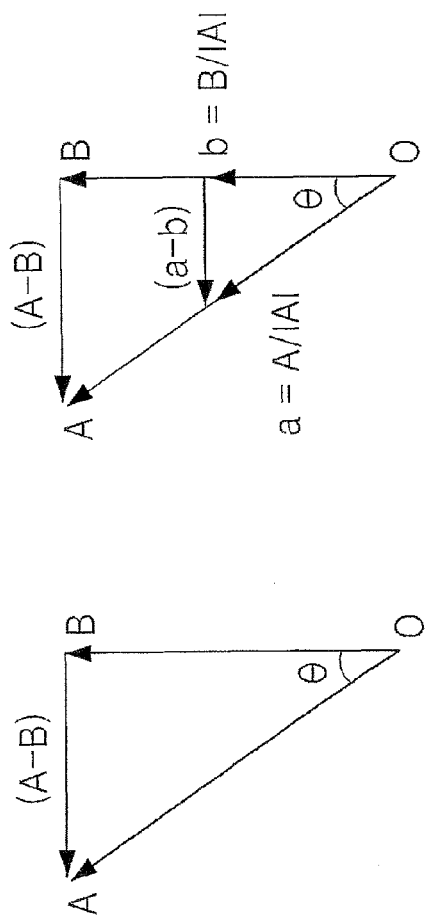
FIG. 10 shows three vector diagrams illustrating the calculation of normalized vector difference for the indirect measure of angle difference used for feature point grouping in the DIS method illustrated in FIGS. 1A through 1F.

FIG. 10 shows three vector diagrams illustrating the calculation of normalized vector difference for the indirect measure of angle difference used for feature point grouping in the DIS method illustrated in FIGS. 1A through 1F. Referring to diagram (a) in FIG. 10, difference vector (A−B) between vector A and vector B is drawn as the horizontal vector labeled (A−B). For ease of reading, diagram (c) is drawn to a larger scale than diagrams (a) and (b). The absolute magnitude ΔM(A−B) of the difference vector (A−B) would be calculated as follows:

$$\Delta M(A-B)=SQRT((xa-xb)^2+(ya-yb)^2),$$

where
A=(xa, ya)
B=(xb, yb)

Referring to diagram (b) in FIG. 10, the normalized vector-a is defined as vector A divided by the absolute value of vector |A|, and thus the normalized vector-a has magnitude of ONE (see diagram (c) of FIG. 10). The normalized vector-b is defined as vector B divided by the absolute value of vector |A|. Magnitudes |A| and |B| are defined by these equations:

$$|A|^2=(xa^2+ya^2)$$

$$|B|^2=(xb^2+yb^2)$$

Note that b=B/|A|, thus the Magnitude ratio is absolute value |b|=|B|/|A|=|(B/|A|)|. Thus, |b| is the magnitude of normalized vector-b, which has been normalized by dividing vector B by magnitude |A| of vector A (i.e., b=B/|A|). Thus, Magnitude ratio |b|=SQRT{(xb^2+yb^2)/(xa^2+ya^2)}.

Because the magnitude |a| of normalized vector-a is ONE, the magnitude |b| is also equal to the magnitude ratio between: the magnitude |a| of normalized vector-A divided by magnitude |b| of normalized vector-b. Thus, magnitude |b| is referred to as the Magnitude Ratio |b|. The Magnitude Ratio |b| is not a function of the angle difference θ between vectors A and B.

As our first grouping decision criteria, we check if |b| (|b|=|B|/|A|) is within the lower and upper magnitude ratio thresholds of $Mr_{Lth}$ and $Mr_{Uth}$. If $|b|^2 < Mr_{Lth}^2$ or $|b|^2 > Mr_{Uth}^2$, then we decide that vector A and vector B cannot be in the same group. But, if $Mr_{Lth}^2 < |b|^2 > Mr_{Uth}^2$ then we make a second comparison based using the normalized vector difference |a−b| as the criteria.

The absolute magnitude |(a−b)| of the normalized vector difference (a−b) is computed according to this equation:

$$|a-b|^2 = [\{(xa-xb)^2+(ya-yb)^2\}/(xa^2+ya^2)]$$

The normalized vector difference (a−b) has absolute magnitude |(a−b)| as shown in diagram (c) of FIG. 10, in which lengths |a|, |b| and |(a|b)| form a triangle with vector difference angle θ being opposite side |(a−b)|, which means that |(a−b)| can also be calculated using the cosine rule as a function of θ. The cosine rule defines the mathematical relation between the length of an unknown side of a triangle to the length of the other sides and the angle opposite to the unknown side. The magnitude |(a−b)| of normalized vector difference (a−b) may be obtained using the cosine rule equation, if the angle between two vectors is given:

$$|(a-b)| = SQRT(1+|b|^2-2*|b|*\cos θ).$$

Thus, an angle threshold expressed as a threshold of magnitude |(a−b)| of normalized vector difference (a−b) (the side of the triangle opposite the angle difference θ in diagram (c) of FIG. 10), can be calculated as a function of |b| and the angle difference θ, as indicated by the cosine rule. Thus, we may define threshold magnitude $Ma_{th}$ of the magnitude |(a−b)| as an angle difference threshold value $θ_{th}$, wherein $Ma_{th}$ is a function of a chosen threshold angle $θ_{th}$. Thus, we may compare the square of calculated magnitude |(a−b)| of normalized vector difference (a−b) with the square of $Ma_{th}$. Thus, $|a-b|^2$ is compared with $Ma_{th}^2$ to decide whether the angular difference between vector A and vector B is small enough that they should be grouped together.

We define $Ma_{th}^2 = (1+|b|^2-2*|b|*\cos θ_{th})$, where $θ_{th}$ is a predetermined angular threshold for grouping decision purposes (e.g., 30 degrees), and $$|b| = |(B/|A|)| = SQRT\{(xb^2+yb^2)/(xa^2+ya^2)\}$$

If $|a-b|^2$ is less than $Ma_{th}^2$, then we decide that vector A and vector B CAN be in the same group. Thus, if $|a-b|^2$ is less than $Ma_{th}^2$ the appropriate final grouping decision is that vector A and vector B are in the same group.

Thus, vector A and vector B are in the same group if $|a-b|^2$ is less than $Ma_{th}^2$ and only if $|b|^2 (\equiv(|B|/|A|)^2)$ is bigger than $Mr_{Lth}^2$ and less than $Mr_{Uth}^2$. The exact calculation of $Ma_{th}^2$ requires one square root operation (i.e., for calculating |b|), and a square root operation can be computationally expensive, or requires substantial hardware implementation. Thus the elimination of a square root operation can significantly reduce computational expense, or hardware. We have devised an approximation for $Ma_{th}$ (i.e., $Ma_{th}=0.5$) that provides good grouping results for |b| equal to 1 plus or minus 30 percent (i.e., for 0.7≤|b|≤1.3) and within 30 degrees of vector error (vector difference) angle (i.e., for −30 degrees≤θ≤+30 degrees). Thus, the second grouping criteria becomes $|a-b|^2 < 0.5^2$.

Figure 12:
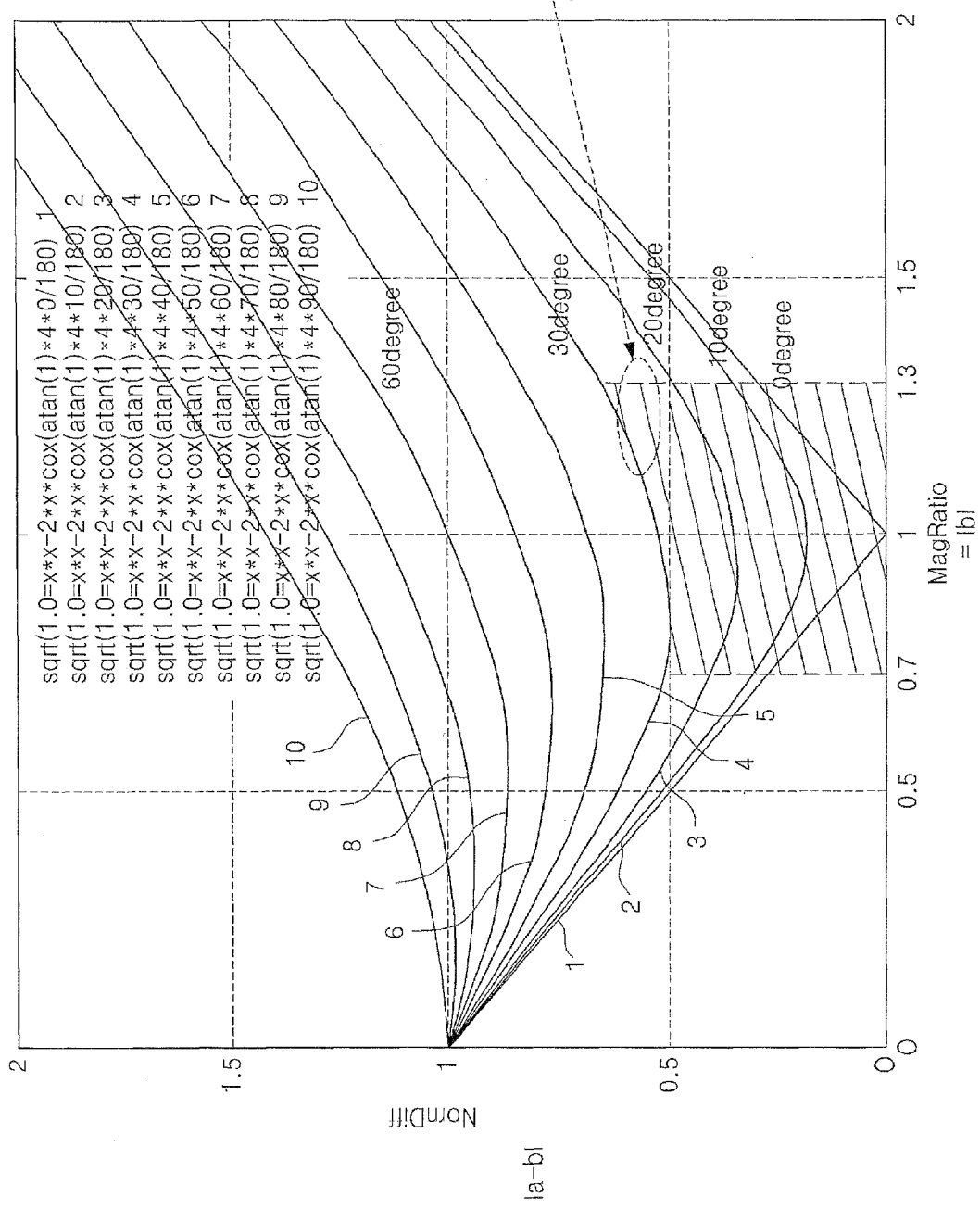
FIG. 12 is a graph of the magnitude |(a−b)| of normalized vector difference (a−b) versus the magnitude ratio |b| of normalized vector difference (a−b), as a function of angle difference $\theta$, illustrating the availability of an approximation for use in a step of the grouping algorithm of FIG. 11.

If we plot the relation between angle difference θ, Magnitude ratio |b| and normalized difference |a−b| we can obtain the graph of FIG. 12.

Figure 11:
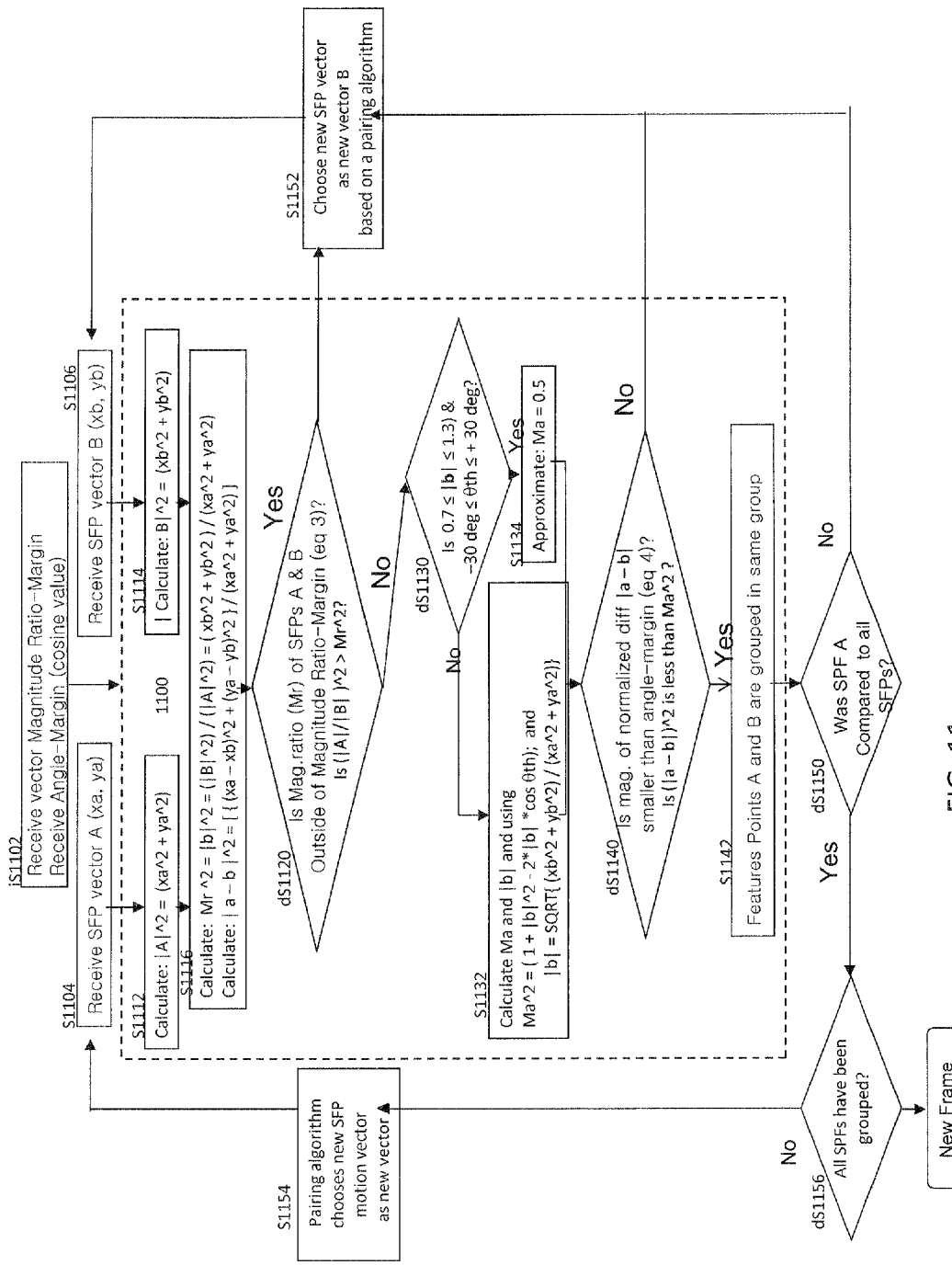
FIG. 11, is a flow chart of a grouping algorithm using normalized vector difference of FIGS. 10A, 10B, 10C for the indirect measure of angle difference between the motion vectors of the selected feature points in the image frame of FIGS. 1A and 2A, for performing vector grouping step of FIG. 1D in the DIS method illustrated in FIGS. 1A through 1F.

FIG. 12 is a graph of the magnitude |(a−b)| of normalized vector difference (a−b) versus the magnitude ratio |b| of normalized vector difference (a−b), as a function of various values of angle difference θ (between 0 degrees and 90 degrees), illustrating the availability of an approximation available for use in decision step dS1140 of the grouping algorithm of FIG. 11.

By experiment, the typical video gives good grouping result with a magnitude ratio greater than 1 plus or minus 30% and with difference angle θ greater up to 30 degrees, as indicated by the bounds of the square region in FIG. 12. This empirical range is effective for the approximation of normalized vector difference between zero and 0.5 as shown in the graph of FIG. 12.

Using the approximation, the $SQRT(1+|b|^2-2*|b|*\cos θ)$ can be approximated as 0.5 regardless of |b|, to reduce the computational burden. Thus, using this approximation, the second grouping decision criteria becomes $|a-b|^2 < 0.5^2$.

FIG. 11, is a flow chart illustrating a grouping process according to an embodiment of the present inventive concept. Grouping process 1100 uses two criteria including normalized vector difference for the indirect measure of angle difference between the motion vectors of the selected feature points (see the image frame of FIGS. 1A and 2A), for performing vector grouping step of FIG. 1D in the DIS method illustrated in FIGS. 1A through 1F. The grouping algorithm 1100 includes the magnitude ratio grouping decision criteria (in decision step SD1120) and the normalized vector difference grouping decision criteria (in decision step SD1140). A paring algorithm (steps S1104, S1106, S1152, dS1150, and S1154) operating externally to the grouping algorithm 1100 keeps track of which feature points (motion vectors) have been already paired with which others, which remain unpaired, and which will be entirely excluded from the grouping algorithm 1100. The paring algorithm provides a pair of SPF motion vectors A & B as inputs to the grouping algorithm 1100. (S1104, S1106). In initialization step iS1102, Magnitude Ratio-Margin(s) (e.g., $Mr_{Lth}^2$ and $Mr_{Uth}^2$), and a Angle-Margin are received from an external circuit and provided to the grouping algorithm 1100.

The grouping algorithm 1100 calculates $|A|^2$ based on received vector A and $|B|^2$ based on received vector B (steps S1112 & S1114) for using these calculated values to make subsequent computations in at least subsequent steps S1116, dS1120, and dS1140. Thus, when the received vector B is excluded from grouping with received vector A, (by the Yes branch of decision step dS1120 or by the No branch of decision step dS1140), the paring algorithm assigns a new vector B (step S1152) and the grouping algorithm computes a new value of $|B|^2$ (step S114) based on the new vector B, but the calculated value of $|A|^2$ (step S112) of current vector A need not be updated at the same time because comparison of the same vector A will continue but with a new vector(s) B. Thus, hardware or software adapted to perform the grouping algorithm 1100 can be configured to separately store one or more instances of the values $|B|^2$ and $|A|^2$ so as to computationally efficiently make multiple comparisons using one of those values as long as only one among vectors A and B is changed at a time.

The grouping algorithm 1100 next calculates magnitude-ratio ($|b|^2$) and $|a-b|^2$ (S1116) using $|A|^2$ and $|B|^2$ (from steps S1112 and S1114). The first (magnitude ratio) grouping decision criteria is applied in decision step dS1120. In decision step dS1120 the square of the magnitude ratio $|b|^2$ is compared with a Magnitude Ratio-Margins (from step iS1102). If $(|A|/|B|)^2 < Mr_{Uth}^2$ or $(|A|/|B|)^2 > Mr_{Uth}^2$, (No branch of decision step dS1120) then current vector A is not grouped with current vector B and comparison with current vector B is ended and a new vector B is selected (step S1152). If $(|A|/|B|)^2$ is between $Mr_{Lth}^2$ and $Mr_{Uth}^2$, (Yes branch of decision step dS1120) then current vector A may become grouped with current vector B and the second grouping decision criteria are applied (in decision step dS1140). If $|b|$ is within a predetermined range (e.g., based on the value of $|b|^2$) and if the angle difference θ is within a predetermined range (Yes branch of the decision step dS1130), then the magnitude $Ma_{th}$ of the normalized difference vector (a−b) is approximated (e.g., as $Ma_{th}^2 = 0.5^2$). Otherwise, (No branch of the decision step dS1130), the magnitude $Ma_{th}$ of the normalized difference vector (a−b) is calculated (S1132).

Next, the approximated or calculated magnitude $Ma_{th}$ of the normalized difference vector (a−b) is used in the second (normalized vector difference) grouping decision criteria in decision step dS1140. In decision step dS1140 the square of $Ma_{th}$ ($Ma_{th}^2$) is compared with $(|a-b|)^2$ and/or with the Angle-Margin (from step iS1102). If $(|a-b|)^2$ is less than $Ma_{th}^2$, (Yes branch of decision step dS1140) then current vector A can be grouped with current vector B (S1142). If $(|A|/|B|)^2$ is not less than $Ma_{th}^2$ (No branch of decision step dS1140) then current vector A is not grouped with current vector B and comparison with current vector B is ended and a new vector B is selected (step S1152).

Once the current vector A has been compared with all available grouping candidates vector Bs (Yes branch of decision step dS1150), then a new vector A is selected and comparisons continue for the remaining (ungrouped) grouping candidates vector Bs (S1154, S1112 etc) or if all vectors have been grouped, the grouping algorithm 1100 waits until a new frame needs to be processed.

Figure 13:
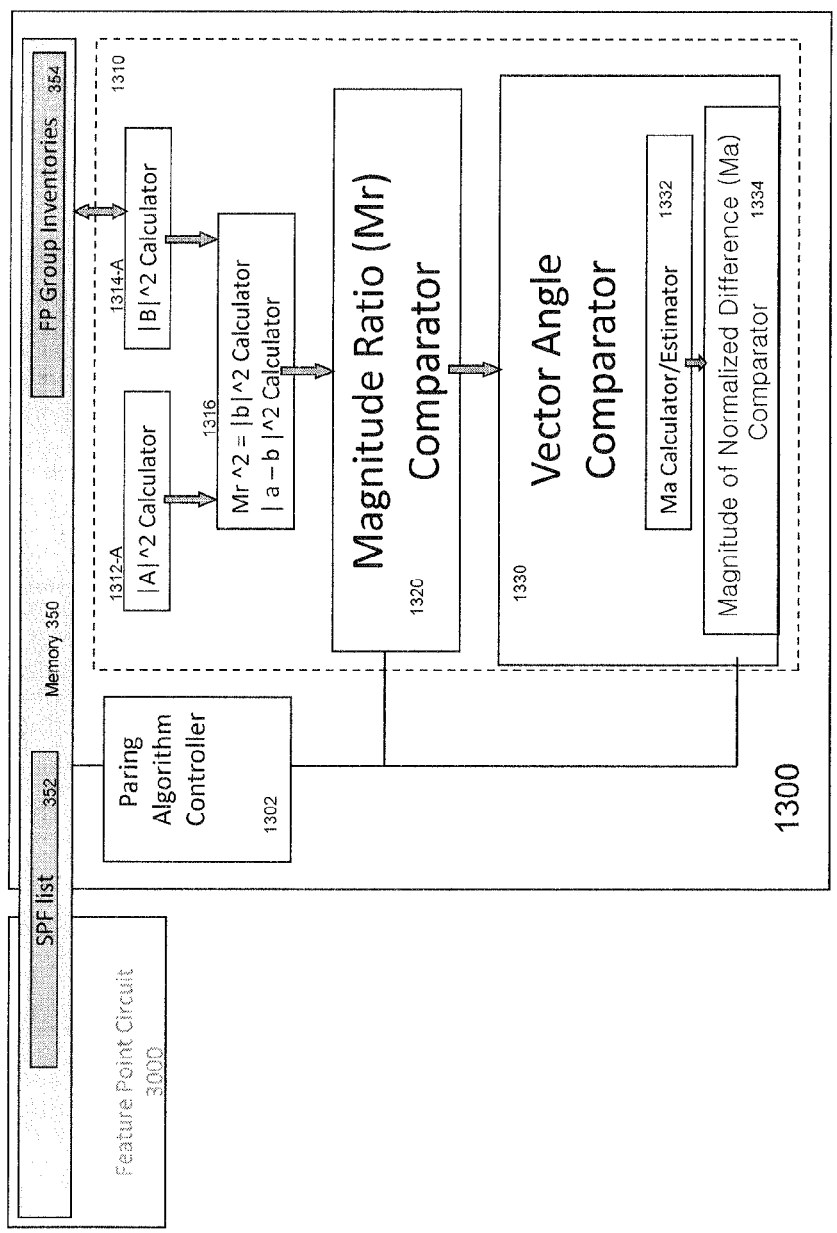
FIG. 13 is a block diagram of Feature Point Grouping Circuit comprising a Grouping Algorithm Circuit 1310 configured to perform the feature point grouping algorithm of FIG. 11.

FIG. 13 is a block diagram of Feature Point Grouping Circuit 1300 comprising a Grouping Algorithm Circuit 1310 configured to perform the feature point grouping algorithm of FIG. 11. The Feature Point Grouping Circuit 1300 comprises a Magnitude Ratio ($|b|$) Comparator 1320 configured to perform the first grouping decision (of decision step dS1120 of FIG. 11) based on the criteria of Magnitude ratio thresholds ($Mr_{Lth}$ & $Mr_{Uth}$) and a Vector Angle Comparator 1330 configured to perform the second grouping decision (of decision step dS1140 of FIG. 11) based on the criteria of normalized vector difference (used for the evaluation of angle difference). The Vector Angle Comparator 1330 in this exemplary embodiment of the inventive concept includes a Magnitude of Normalized Difference ($Ma_{th}$) Calculator/Estimator 1334 and a Magnitude of Normalized Difference ($Ma_{th}$) Comparator 1334. The Magnitude of Normalized Difference ($Ma_{th}$) Calculator/Estimator 1334 generates or calculates as described herein above with respect to steps dS1130, S1132, and S1134 of FIG. 11.

The Feature Point Grouping Circuit 1300 shares the RAM Memory 350 with the Feature Point Circuit 3000 of FIG. 3. The SPF list 352 portion of the memory 350 contains the list of selected feature points output by the Feature Point Candidate Sorter 340. The Paring Algorithm Controller 1302 in the Feature Point Grouping Circuit 1300 DMA accesses the SPF list 352 and selects vectors A and vectors B for comparison in the Grouping Algorithm Circuit 1310 as described herein above with respect to steps S1152, S1154, dS1156, and dS1150 of FIG. 11. When a comparison results in one or more groups of vectors (groups of selected feature points), the Paring Algorithm Controller 1302 writes the grouped vectors or a descriptive list thereof into the FP Group Inventories 354 portion of the memory 350. According to one embodiment, the Feature Point Grouping Circuit 1300 and memory 350 are embodied in a single integrated circuit chip, and data retrieved from memory 350 is output to circuitry external to the chip via I/O pins. According to another embodiment, the Feature Point Grouping Circuit 1300, the RAM Memory 350, and the Feature Point Circuit 3000 are embodied in a single integrated circuit chip. According to such embodiment, one ordinary skilled in the art can readily appreciate that if additional memory capacity is needed, another RAM memory can be added external to the integrated circuit chip.

Feature Point Grouping Circuit 1300 further comprises a $|A|^2$ Calculator 1312, a $|B|^2$ Calculator 1312 and a $|b|^2$ & $|a-b|^2$ Calculator 1316, configured to perform steps S1112, S1114, and S1116 of FIG. 11 respectively.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of processing video data using a video processing circuit, comprising:
   receiving first image data that represents a first frame;
   identifying a plurality of feature points in the first frame;
   receiving second image data that represents a second frame;
   deriving a plurality of motion vectors, each of the plurality of motion vectors corresponding to each respective feature point;
   selecting a first vector and a second vector among the plurality of motion vectors; and
   comparing the first vector with the second vector based on a vector magnitude ratio and a vector angular difference of the first vector and the second vector.

2. The method of claim 1, further comprising:
   setting a magnitude ratio threshold and an angular difference threshold; and
   grouping the first vector and the second vector together if the vector magnitude ratio falls within the magnitude ratio threshold and the vector angular difference falls within the angular difference threshold.

3. The method of claim 2, further comprising separating the first vector and the second vector, if the vector magnitude ratio falls outside the magnitude ratio threshold or the vector angular difference falls outside the angular difference threshold.

4. The method of claim 3, further comprising identifying a first feature point group, if the vector magnitude ratio of the first vector and the second vector falls outside the magnitude ratio threshold or the vector angular difference of the first vector and the second vector falls outside the angular difference threshold, by:
   selecting a third vector among the plurality of motion vectors;
   replacing the second vector with the third vector;
   comparing the first vector with the replaced second vector based on the vector magnitude ratio and the vector angular difference of the first vector and the second vector; and determining whether the first vector is grouped with the second vector based on a result of the comparing the first vector with the second vector.

5. The method of claim 3, further comprising identifying a second feature point group, if the vector magnitude ratio of the first vector and the second vector falls outside the magnitude ratio threshold or the vector angular difference of the first vector and the second vector falls outside the angular difference threshold, by:
  replacing the first vector with the second vector;
  selecting a fourth vector among the plurality of motion vectors;
  replacing the second vector with the fourth vector;
  comparing the first vector with the second vector based on the vector magnitude ratio and the vector angular difference of the first vector and the second vector; and
  determining whether the first vector is grouped with the second vector based on a result of the comparing the first vector with the second vector.

6. The method of claim 2, wherein the comparing the first vector with the second vector based on the vector magnitude ratio comprises calculating the vector magnitude ratio of the first vector and the second vector, the vector magnitude ratio being $SQRT(|B|/|A|)^2)=SQRT\{(xb^2+yb^2)/(xa^2+ya^2)\}$, A being the first vector and having components (xa, ya), B being the second vector and having components (xb, yb).

7. The method of claim 6, wherein the magnitude ratio threshold is set such that an equation, $(1-r)^2<(|B|/|A|)^2<(1+r)^2$, is satisfied, r being the magnitude ratio threshold, r being a real number that is less than one and greater than zero.

8. The method of claim 2, wherein the comparing the first vector with the second vector based on the vector angular difference of the first vector and the second vector comprises comparing a magnitude of a normalized vector difference of the first vector and the second vector with a threshold magnitude of the first vector and the second vector, the magnitude of the normalized vector difference of the first vector and the second vector being $SQRT\{|a-b|^2\}=SQRT[\{(xa-xb)^2+(ya-yb)^2\}/(xa^2+ya^2)]$, the first vector having components (xa, ya), the second vector having components (xb, yb).

9. The method of claim 8, wherein the threshold magnitude of the first vector and the second vector is a function of the angular difference threshold, the threshold magnitude of the first vector and the second vector being $SQRT(1+|b|^2-2*|b|*\cos \theta_{th})$, $\theta_{th}$ being the angular difference threshold, |b| being the vector magnitude ratio of the first vector and the second vector, |b| being $SQRT\{(|B|/|A|)^2\}=SQRT\{(xb^2+yb^2)/(xa^2+ya^2)\}$, and
  the comparing the first vector with the second vector based on the vector angular difference of the first vector and the second vector includes only one square root operation.

10. The method of claim 9, wherein $|a-b|^2 \leq 0.5^2$.

11. The method of claim 1, wherein the comparing the first vector with the second vector is performed without using a square root operation.

12. A video processing circuit, comprising:
  a feature point circuit configured to identify a plurality of feature points in a first frame and deriving a plurality of motion vectors between the first frame and a second frame, each of the plurality of motion vectors corresponding to each respective feature point;
  a paring controller configured to select a first vector and a second vector among the plurality of motion vectors;
  a magnitude ratio comparator configured to compare the first vector with the second vector based on a vector magnitude ratio of the first vector and the second vector; and
  a vector angle comparator configured to compare the first vector with the second vector based on a vector angular difference of the first vector and the second vector.

13. The video processing circuit of claim 12, wherein the magnitude ratio comparator compares the vector magnitude ratio of the first vector and the second vector with a magnitude ratio threshold, the vector magnitude ratio being $SQRT(|B|/|A|)^2)=SQRT\{(xb^2+yb^2)/(xa^2+ya^2)\}$, A being the first vector and having components (xa, ya), B being the second vector and having components (xb, yb).

14. The video processing circuit of claim 13, wherein the magnitude ratio threshold equals $(|A|/|B|)^2$.

15. The video processing circuit of claim 14, wherein the magnitude ratio threshold is set such that an equation, $(1-r)^2<(|B|/|A|)^2<(1+r)^2$, is satisfied, r being the magnitude ratio threshold, r being a real number that is less than one and greater than zero.

16. The video processing circuit of claim 12, wherein the vector angle comparator compares a magnitude of a normalized vector difference of the first vector and the second vector with a threshold magnitude of the first vector and the second vector, the magnitude of the normalized vector difference of the first vector and the second vector being $SQRT\{|a-b|^2\}=SQRT[\{(xa-xb)^2+(ya-yb)^2\}/(xa^2+ya^2)]$, the first vector having components (xa, ya), the second vector having components (xb, yb).

17. The video processing circuit of claim 16, wherein the threshold magnitude of the first vector and the second vector is a function of an angular difference threshold, the threshold magnitude of the first vector and the second vector being $SQRT(1+|b|^2-2*|b|*\cos \theta_{th})$, $\theta_{th}$ being the angular difference threshold, |b| being the vector magnitude ratio of the first vector and the second vector, |b| being $SQRT\{(|B|/|A|)^2\}=SQRT\{(xb^2+yb^2)/(xa^2+ya^2)\}$.

18. The video processing circuit of claim 17, wherein $|a-b|^2=0.5^2$.

19. The video processing circuit of claim 12, further comprising a memory configured to store a first group of the plurality of feature points having a first motion characteristic and a second group of the plurality of feature points having a second motion characteristic.

20. The video processing circuit of claim 19, further comprising I/O pins connected to the memory, the I/O pins being configured to transfer data retrieved from the memory to a circuit external to a semiconductor chip in which the video processing circuit is implemented.

21. A method of processing video data using a video processing circuit, comprising:
  estimating motion vectors for a plurality of feature points in a first frame of the video data;
  grouping the motion vectors into a plurality of motion vector subsets based on vector magnitude ratios and vector angular differences of the motion vectors; and
  selecting one of the plurality of motion vector subsets that contains the motion vectors representing a movement of a stationary object within a scene of the first frame.

22. The method of claim 21, wherein the grouping the motion vectors into the plurality of motion vector subsets comprises:
  selecting a first vector and a second vector among the plurality of motion vectors; and
  comparing the first vector with the second vector based on the vector magnitude ratio and the vector angular difference of the first vector and the second vector.

23. The method of claim 21, further comprising:
  selecting the motion vector candidates for a plurality of tiles, each of the tile motion vectors having a lowest sum-of-absolute-difference, each of the plurality of tiles being divided from a portion of the first frame;

estimating tile motion vectors for the plurality of tiles, using subsampled luminance data; and grouping the tile motion vectors into a plurality of tile motion vector subsets based on the vector magnitude ratios and the vector angular differences of the tile motion vectors.

24. The method of claim 21, wherein the selecting one of the plurality of motion vector subsets comprises rejecting at least one motion vector subset that represents a local movement of moving objects in the first frame.

25. A camera, comprising:

an image capture circuit configured to capture images and convert a plurality of images to a first frame and a second frame of image data; and a video processing circuit chip comprising:

a feature point circuit configured to identify a plurality of feature points in the first frame and deriving a plurality of motion vectors between the first frame and the second frame, each of the plurality of motion vectors corresponding to each respective feature point;

a paring controller configured to select a first vector and a second vector among the plurality of motion vectors;

a magnitude ratio comparator configured to compare the first vector with the second vector based on a vector magnitude ratio of the first vector and the second vector; and a vector angle comparator configured to compare the first vector with the second vector based on a vector angular difference of the first vector and the second vector.

26. The camera of claim 25, further comprising a grouping circuit configured to group the plurality of motion vectors into a plurality of subsets based on motion characteristics and select one among the plurality of subsets that represents a stationary object within a scene of the first frame.

* * * * *